United States Patent
Lukens et al.

(10) Patent No.: US 11,695,551 B2
(45) Date of Patent: Jul. 4, 2023

(54) QUANTUM FREQUENCY PROCESSOR FOR PROVABLE CYBERSECURITY

(71) Applicant: UT-Battelle, LLC, Oak Ridge, TN (US)

(72) Inventors: Joseph M. Lukens, Knoxville, TN (US); Pavel Lougovski, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 541 days.

(21) Appl. No.: 16/802,337

(22) Filed: Feb. 26, 2020

(65) Prior Publication Data
US 2020/0274703 A1    Aug. 27, 2020

Related U.S. Application Data

(60) Provisional application No. 62/810,517, filed on Feb. 26, 2019.

(51) Int. Cl.
*H04L 9/08* (2006.01)
*G06N 10/00* (2022.01)

(52) U.S. Cl.
CPC ........... *H04L 9/0858* (2013.01); *G06N 10/00* (2019.01)

(58) Field of Classification Search
CPC ............................ H04L 9/0858; G06N 10/00
See application file for complete search history.

(56) References Cited

U.S. PATENT DOCUMENTS

| 7,536,012 | B1* | 5/2009 | Meyers | H04L 9/0858 |
| | | | | 380/44 |
| 2017/0324552 | A1* | 11/2017 | Ahn | H04L 9/0852 |
| 2020/0153619 | A1* | 5/2020 | Ribordy | H04L 9/0852 |
| 2021/0273792 | A1* | 9/2021 | Coady | G06N 10/00 |

OTHER PUBLICATIONS

Gisin et al., "Quantum communication," *Nature Photonics*, 1:165-171 (Mar. 2007).
Gisin et al., "Quantum cryptography," *Reviews of Modern Physics*, 74(1):145-195 (Jan. 1, 2002).
Kues et al., "Quantum optical microcombs," *Nature Photonics*, 13:170-179 (Mar. 2019).
Lu et al., "A controlled-NOT gate for frequency-bin qubits," *Nature Partner Journals*, pp. 1-8 (Mar. 5, 2019).

(Continued)

*Primary Examiner* — Baotran N To
(74) *Attorney, Agent, or Firm* — Klarquist Sparkman, LLP

(57) ABSTRACT

Methods of quantum key distribution include receiving a frequency bin photon at a location, selecting a frequency bin photon quantum key distribution measurement basis, with a quantum frequency processor, performing a measurement basis transformation on the received frequency bin photon so that the frequency bin photon is measurable in the selected frequency bin photon quantum key distribution measurement basis, and detecting the frequency bin photon in the selected quantum key distribution measurement basis and assigning a quantum key distribution key value based on the detection to a portion of a quantum key distribution key. Apparatus and methods for encoding, decoding, transmitting, and receiving frequency bin photons are disclosed.

18 Claims, 16 Drawing Sheets

(56) References Cited

OTHER PUBLICATIONS

Lu et al., "Electro-Optic Frequency Beam Splitters and Tritters for High-Fidelity Photonic Quantum Information Processing," *Physical Review Letters*, 120:030502-1-030502-6, supplementary material, pp. 1-5 (Jan. 18, 2018).
Lu et al. "Quantum interference and correlation control of frequency-bin qubits." *Optica*, vol. 5, No. 11, pp. 1455-1460, supplementary material pp. 1-4 (Nov. 2018).
Lukens et al., "Frequency-encoded photonic qubits for scalable quantum information processing," *Optica*, 4(1):8-16, supplementary material, pp. 1-4 (Jan. 2017).

* cited by examiner

QUANTUM FREQUENCY PROCESSOR FOR PROVABLE CYBERSECURITY

CROSS REFERENCE TO RELATED APPLICATION

This application claims priority to U.S. Provisional Patent Application No. 62/810,517, filed Feb. 26, 2019, which is incorporated by reference herein.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

The field is quantum frequency processors and quantum cryptography.

BACKGROUND

As the world continues to become more and more connected—not only people and organizations, but also automated devices in the Internet of Things (IoT)—both the threats and potential consequences of cyberattacks are multiplying at a blistering pace. Such threats are particularly acute in energy delivery systems, where cyberattacks not only entail massive economic impact, but also endanger national security and threaten human safety. Accordingly, ensuring a more secure, resilient grid for the future is of utmost importance, requiring extensive preparation and countermeasures at all levels of the security stack, from the physical layer to the human users themselves. Since quantum key distribution (QKD) relies on the laws of physics, and not the hardness of a mathematical problem, QKD forms a promising tool for future-proofing the security of energy delivery systems and other communication networks. However, while QKD's potential is unmatched, it faces many practical challenges toward widespread adoption, including speed of communication and lack of compatibility with existing fiber-optic infrastructure. Thus, a need remains for improved quantum cryptography and quantum key distribution approaches.

SUMMARY

According to an aspect of the disclosed technology, methods of quantum key distribution include receiving a frequency bin photon at a location, selecting a frequency bin photon quantum key distribution measurement basis, with a quantum frequency processor, performing a measurement basis transformation on the received frequency bin photon so that the frequency bin photon is measurable in the selected frequency bin photon quantum key distribution measurement basis, and detecting the frequency bin photon in the selected quantum key distribution measurement basis and assigning a quantum key distribution key value based on the detection to a portion of a quantum key distribution key. Some methods include repeating the steps of selecting, performing, and detecting, and forming the quantum key distribution key from the assigned quantum key distribution key values. Some examples include receiving a transmission encoded with the quantum key distribution key, and decoding the transmission with the quantum key distribution key. In some examples, the forming comprises forming the quantum key distribution key as a one-time pad. In some examples, the forming includes publishing the selected frequency bin photon quantum key distribution measurement bases, discarding assigned quantum key distribution key values that do not have a matching measurement basis between a sender and receiver and retaining assigned quantum key distribution key values that do have a matching measurement basis to form the quantum key distribution key, comparing a subset of the retained assigned quantum key distribution values to determine a quantum bit error rate for the quantum key distribution key, and determining whether to keep the quantum key distribution key based on the quantum bit error rate. Some examples include amplifying the privacy of the quantum key distribution key. In some examples, the performing the measurement basis transformation comprises defining a Hadamard gate with the quantum frequency processor and performing the measurement basis transformation with the Hadamard gate. In some examples, the performing the measurement basis transformation with the quantum frequency processor includes directing the received frequency bin photon through a first electro-optic modulator configured to mix frequency modes of the received frequency bin photon and form a mode-mixed frequency bin photon, directing the mode-mixed frequency bin photon through a pulse shaper configured to selectively adjust a phase of different frequency modes of the mode-mixed frequency bin photon, and directing the pulse-shaped mode-mixed frequency bin photon through a second electro-optic modulator configured to return frequency modes scattered outside of an encoding space of the pulse-shaped mode-mixed frequency bin photon. In some examples, the performing the measurement basis transformation with the quantum frequency processor comprises directing the received frequency bin photon through N+1 electro-optic modulators and N pulse shapers alternately arranged in series. Some examples include receiving additional frequency bin photons across a range of frequency bin channels of a frequency comb spectrum simultaneous with the received frequency bin photon. Some examples include parallel processing the additional frequency bin photons with the quantum frequency processor. In some examples, the parallel processing includes, simultaneous or nearly simultaneous with receiving the frequency bin photon, selecting frequency bin photon quantum key distribution measurement bases for the additional frequency bin photons, with the quantum frequency processor, performing measurement basis transformations on the additional frequency bin photons so that the additional frequency bin photons are measurable in the selected frequency bin photon quantum key distribution measurement bases, and detecting the additional frequency bin photons in the selected quantum key distribution measurement bases and assigning quantum key distribution key values to the quantum key distribution key based on the detection to (i) another portion of the quantum key distribution key or (ii) one or more other quantum key distribution keys different from the quantum key distribution key. In some examples, the receiving the frequency bin photon comprises receiving one or more photons along a common optical path of a single-mode optical fiber. In some examples, the receiving the frequency bin photon includes receiving the frequency bin photon as a single photon generated, encoded, and sent from a distant location. In some examples, the receiving the frequency bin photon includes receiving the frequency bin photon as an entangled state photon generated at a distant location without being encoded with any information at the distant location such that a distant photon forms an entangled state partner of the entangled state photon. In some examples, the performing the measurement basis transformation with the quantum frequency processor includes directing the received frequency bin photon through an integrated photonic chip. In some examples, the receiving the frequency bin photon includes receiving the frequency bin photon as a photon in superposition with a plurality of frequency bins. Some examples include receiving an other frequency bin photon at the location, wherein the other frequency bin photon is entangled with the frequency bin photon and separated by a plurality of frequency bins from the frequency bin photon, wherein the frequency bin photon and the other frequency bin photon form an entangled photon pair.

According to another aspect of the disclosed technology, apparatus include a quantum frequency processor configured to receive a frequency bin photon at a location to determine a quantum key distribution value for a quantum key distribution key, and configured to perform a selected measurement basis transformation on the received frequency bin photon so that the frequency bin photon is measurable in the selected frequency bin photon quantum key distribution measurement basis, and a detector configured to detect the frequency bin photon in the selected quantum key distribution measurement basis to generate the quantum key distribution key. In some examples, the quantum key distribution key comprises a plurality of the quantum key distribution key values associated with the detection of a plurality of a frequency bin photons. In some examples, the quantum key distribution key is a one-time pad. In some examples, the quantum frequency processor is configurable to define a Hadamard gate to perform the measurement basis transformation with the Hadamard gate. In some examples, the quantum frequency processor includes a first electro-optic modulator configured to mix frequency modes of the received frequency bin photon and form a mode-mixed frequency bin photon, a pulse shaper configured to receive the mode-mixed frequency bin photon and to selectively adjust a phase of different frequency modes of the mode-mixed frequency bin photon, and a second electro-optic modulator configured to return frequency modes scattered outside of an encoding space of the pulse-shaped mode-mixed frequency bin photon. In some examples, the pulse shaper includes diffraction grating configured to receive the mode-mixed frequency bin photon and to disperse frequency bin modes at different angles, and a mask configured to selectively apply different phase shifts to different ones of the frequency bin modes. In some examples, the quantum frequency processor includes N+1 electro-optic modulators and N pulse shapers alternately arranged in series. In some examples, the quantum frequency processor includes an integrated photonic chip. In some examples, the frequency bin photon includes a photon in superposition with a plurality of frequency bins. In some examples, the quantum frequency processor and detector are arranged in a frequency bin quantum key distribution receiver unit. In some examples, the quantum frequency processor and detector are arranged in a frequency bin quantum key distribution sender unit. Some examples include a frequency comb configured to generate frequency bin photons. Some examples include a frequency minicomb including a nonlinear microresonator, wherein the frequency minicomb is configured to produce frequency bin photons.

According to a further aspect of the disclosed technology, methods include generating one or more photons with frequency bin measurement basis characteristics associated with a quantum key distribution value by using a random number generator to define the frequency measurement basis and a quantum frequency comb or a quantum frequency processor coupled to the random number generator to produce the one or more photons in the randomly defined frequency bin measurement basis, and transmitting the one or more photons through a single-mode optical fiber to a receiver to establish a quantum key distribution key. In some examples, the generating the one or more photons comprises pumping a micro-ring resonator of the quantum frequency comb and filtering the output of the micro-ring resonator to define the frequency bins. Some examples include receiving frequency bin measurement bases from the receiver and comparing the receiver's frequency bin measurement bases to the frequency bin measurement basis characteristics to determine a quantum bit error rate.

According to another aspect of the disclosed technology, frequency bin quantum key distribution keys are generated and used to encode and decode transmissions. In some examples, the entire length of the QKD key is greater than or equal to the entire length of a transmitted message such that the transmitted message is provably secure. In representative examples, the frequency bins are located around 1310 nm+/−5 nm, +/−10 nm, +/−20 nm, +/−50 nm, or +/−100 nm, and/or around 1550 nm+/−5 nm, +/−10 nm, +/−20 nm, +/−50 nm, though other ranges are possible. In particular examples, the frequency bins are located in the C band between about 1530 nm to about 1565 nm. Representative methods transmit the frequency bin qubits in one or more optical pulses, with each optical pulse including one or more photons in a single spatial transverse mode.

In an aspect of the disclosed technology, methods include verifying a quantum key distribution key defined by frequency-bin qubits and decoding a transmission encoded with the frequency-bin defined key.

Various aspects of the disclosed technology include methods and apparatus for transmission and/or receiving of frequency bin photons used for quantum key distribution and methods and apparatus for quantum key distribution encoding and/or decoding.

According to an aspect of the technology, methods include adjusting only a spectral phase to fully control independent operations in parallel on spectrally separated qubits.

The foregoing and other features and advantages of the disclosed technology will become more apparent from the following detailed description, which proceeds with reference to the accompanying figures.

DETAILED DESCRIPTION

Figure 1:
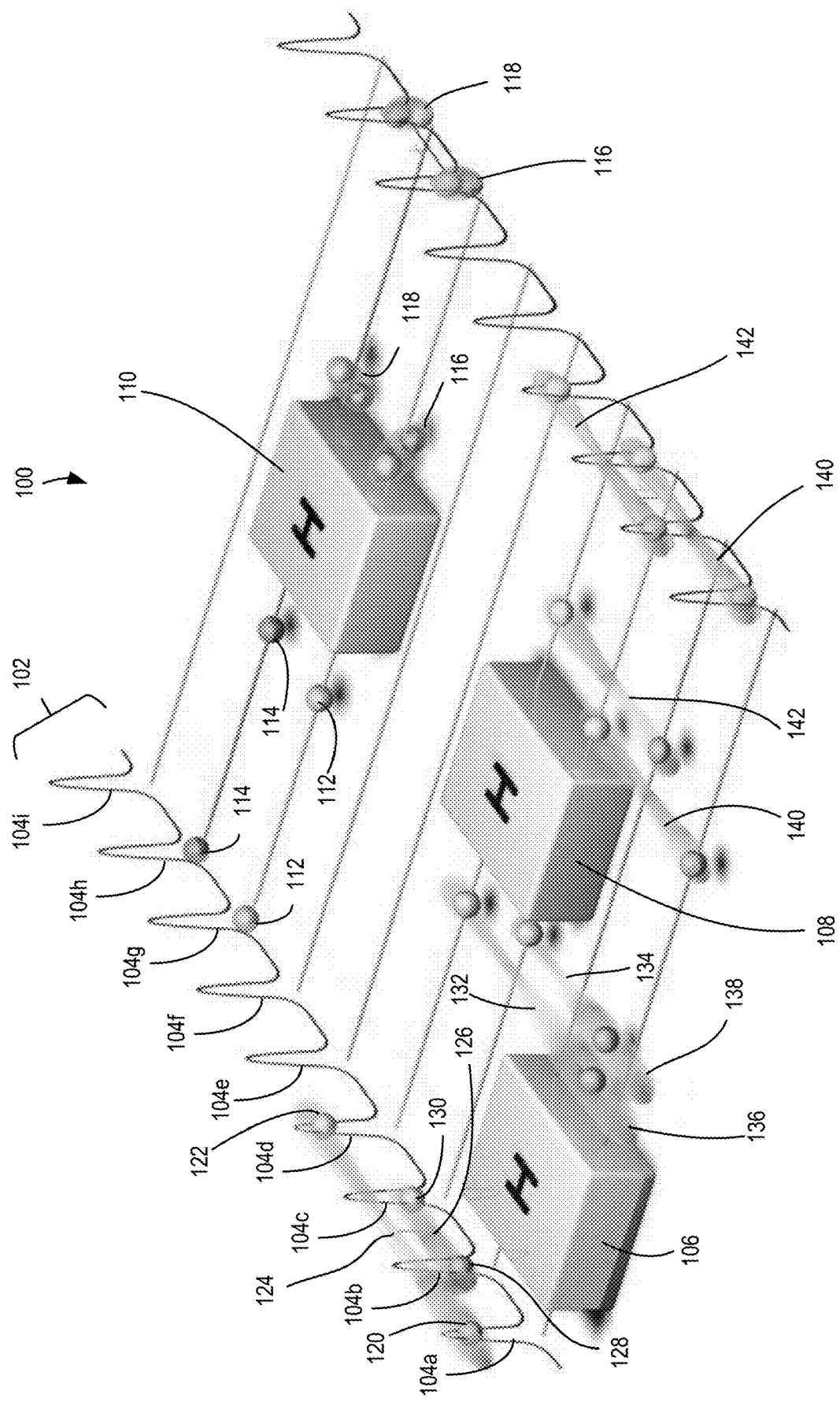
FIG. 1 is a perspective schematic of an operating quantum frequency processor.

Disclosed examples can be used to protect electric grids against cybersecurity threats. At the level of signal transmission and encryption specifically, quantum key distribution (QKD) can be used to provide security between remote parties. In particular, QKD has the potential to be made provably secure against algorithmic and technological advances. Representative examples of QKD methods and systems described herein, unlike many previous technologies, can be integrated seamlessly into existing fiber-optic infrastructure and enable high-speed encryption through frequency-domain parallelization. Examples of quantum frequency processors (QFPs) can be adapted to fit within a 19" rack mount, requiring no user adjustments inside the enclosure, and can be deployable in power delivery environments for implementing point-to-point QKD between, e.g., power plants and substations. By implementing QKD protocols using QFPs, problems normally associated with optical transmission, including polarization dependent effects such as polarization mode dispersion and birefringence can be avoided.

Encoding in the frequency degree of freedom of photons can be achieved with QFPs. Disclosed examples can modulate and measure the quantum states of many frequency-encoded quantum bits (or frequency-bin qubits), including in parallel, as received from a common optical fiber. QFPs can be configured to implement fundamental quantum state operations, such as the Hadamard gate and controlled-NOT, which are useful for applications in quantum computing and QKD. Specifically, the ability to apply different operations to frequency qubits received along a common fiber path represents a unique capability not possible with other QKD platforms. Also, the large bandwidth of frequency-bin qubit transmissions can allow the processing of many such qubits in parallel (up to 33 in one example), enabling the QFP to make use of classical wavelength-division multiplexing (WDM) for vastly increasing the overall communication rate. For example, a 33-qubit parallelization could yield a 33× improvement in overall speed, which can produce a 33× faster response time to cyber threats, compared to single-channel QKD. Selected examples can utilize off-the-shelf telecom components—electro-optic phase modulators and pulse shapers—allowing compatibility with existing fiber-optic infrastructure. Accordingly, compared to other approaches to quantum communication, disclosed examples using QFPs can provide the unique potential for both integration into current fiber networks and improved overall secure key rate via frequency parallelization.

Disclosed examples can enable faster, more reliable, and provably secure QKD encryption, significantly reducing the cyberattack surface and effectively thwarting attacks that rely on hacking into a system at the physical layer of data transmission. Thus, any attempt to retrieve the encryption key or masquerade as legitimate user will produce observable disturbances in the measured quantum bit error rate, alerting the system immediately. This real-time cyber situational awareness is made possible by the continuous generation of quantum key bits, which in turn relies on software-controlled QFPs. Thus, in electric grid examples, any cyberattack directed towards destabilizing the grid will be detected either (i) when eavesdropping on the encryption key for later impersonation of a legitimate party, or (ii) when attempting to force a command directly, because it will not be able to reproduce—even in principle—the actual key.

Quantum information encoding in optical frequency can allow for quantum computing both on chip and over distributed fiber networks. In particular, encoding in optical frequency bins in accordance with the disclosed technology can be used to administer QKD methods. Considerable progress has been made in generating two-photon entanglement across a comb of narrowband frequency modes, or bins, including optical parametric oscillators below threshold, filtering of broadband parametric down conversion, and, recently, on-chip production of quantum frequency combs using microring resonators. Likewise, research in quantum frequency conversion has showcased coherent translation of single-photon states across both wide and narrow bandwidths.

Moving from entangled-state production and single-photon frequency manipulation to actual quantum information processing in frequency-encoded qubits can require the ability to apply independent and distinct gates efficiently and with low noise to multiple qubits on demand. According with disclosed examples herein, tunable and independent single-frequency-qubit operations are demonstrated, including operations implemented in parallel on co-propagating qubits. In particular examples, qubit operations can be tuned smoothly between the identity 1 and Hadamard H gates, with specific examples allowing any combination thereof in parallel in the same device.

In experiments discussed below, the tunability of quantum operations are demonstrated with frequency-bin Hong-Ou-Mandel (HOM) interference, obtaining 97% visibility for distinct frequency bins, the highest yet observed for photons of different colors. Operations are implemented as two separate quantum gates on frequency-bin qubits within the same fiber-optic mode, obtaining a high-fidelity flip of spectral correlations on two entangled photons. Results demonstrate multiple functionalities in parallel in a single platform, representing an important step forward for quantum information processing in the frequency domain.

When selected properly, the frequency degree of freedom is compatible with optical fiber and valuable for scaling up quantum memories, and potentially large amounts of information can be stored in single photons in spectro-temporal modes. Yet, while frequency multiplexing can be schematically straightforward in the quantum domain, universal quantum gate sets in frequency space are much more challenging to implement. As important milestones, frequency beamsplitters, based either on optical nonlinearities or electro-optic modulation, have shown coherent interference of frequency-encoded photons, and quantum pulse gates based on mixing single photons with shaped control fields have allowed state discrimination of orthogonal time-frequency pulsed modes. Yet, the ability to perform distinct and controlled operations simultaneously across several qubits in the same spatial mode has thus far remained elusive. Nonlinear-optics-based approaches offer such a capability in theory by using multiple strong pump fields. However, the prospects of scaling such approaches with low noise to two or more qubits are uncertain. Alternatively, a fully linear-optic scheme for quantum information processing with time-bin encoding has also been developed. While in principle enabling universal quantum computing in a single spatial mode, its requirement of fast polarization rotation—or alternatively, long birefringent delay-makes it challenging to realize in its pure, single-spatial-mode form. Indeed, the seminal experimental implementation enlisted ancillary spatial modes for time/polarization conversion, so a fully single-spatial-mode realization was still missing. Finally, in the case of frequency-bin encoding, electro-optic approaches excel at performing the same low-noise quantum gate on multiple qubits in parallel but so far have been unable to perform different gates concurrently, until now.

Disclosed examples of frequency-bin processing, which use combinations of electro-optic phase modulators (EOMs) and Fourier transform pulse shapers in representative examples, are well suited for removing the above noted limitations and scaling up frequency-based quantum networks. In particular examples, this paradigm is sufficient for universal quantum computing, requires no optical pump fields for the frequency-bin operations, has low noise, and accepts broadband inputs without the need for tailored phase matching. Even more importantly, the fact that pulse shapers apply arbitrary phase shifts to each frequency mode suggests the possibility of synthesizing different frequency-bin gates on two qubits in parallel, even when they experience the same temporal modulation from the EOMs. As demonstrated herein, this intuition is indeed correct, representative examples adjusting only spectral phase can realize fully controlled and independent operations in parallel on spectrally separated qubits.

Concept of Quantum Frequency Processor Operation

FIG. 1 schematically illustrates an example of how quantum mechanical principles can be applied in parallel in an example quantum frequency processor 100, with the particular operations chosen to match experiments described herein. As shown, single photons received by the quantum frequency processor (QFP) 100 are depicted as spheres populating a comb 102 of frequency bins 104a-104i propagate through a parallelized network of Hadamard quantum gates 106, 108, 110 performing a selected set of quantum operations, such as Hadamard transformations. Entangled states are sums of photon products and are illustrated by clouds containing spheres of the same pair of colors. Frequency superpositions are illustrated in some instances by spheres straddling multiple lines, which can be realized experimentally with parallel single-qubit rotations.

Spheres 112, 114 at the input of the QFP 100 are of a specific color (e.g., frequency bin) and each traces the probability amplitudes of a single input photon, so that an ideal measurement will register precisely one click for respective frequency bins 104g, 104h if detected without further quantum state modification. By directing the spheres (photons) 112, 114 through the quantum gate 110 simultaneously and with a selected phase shift corresponding to a Hadamard transformation (e.g., π) and Hong-Ou-Mandel (HOM) interference, the quantum state of the photon pair can be adjusted such that the photons are in a superposition between both being in frequency bin 104g (116) and both in bin 104h (118). Thus, coincident measurements of a photon in frequency bin 104g and a photon in frequency bin 104h stop occurring based on the state change of the quantum system. As discussed herein, HOM interference can be used to experimentally verify this effect and can be used in selected detection schemes in QKD examples.

At the input of the QFP 100 spheres 120, 122 represent one possibility of the pair 124 with one photon (sphere 120) in frequency bin 104a and the other photon (sphere 122) in frequency bin 104d. However, this photon pair state 124 is in a superposition with a second photon pair state 126 having one photon (sphere 128) in frequency bin 104b and the other photon (sphere 130) in frequency bin 104c. Consequently, without any quantum state transformations, there is equal probability of measuring either a coincidence detection of one photon in frequency bin 104a and one photon in frequency bin 104d, or a coincidence detection of one photon in frequency bin 104b and one photon in frequency bin 104c (compare with FIG. 4A).

After transmission through the quantum gate 106 configured for Hadamard transformation, the correlation of frequency bins of the entangled photon pair 124, 126 (pair possibilities in superposition with each other) are changed with respect to the portions in the frequency bins 104a, 104b. The modified state is the superposition 132, 134 formed with portions of the photon previously in either frequency bin 104a or 104b now forming superpositional portions 136, 138 straddling across the frequency bins 104a, 104b. The modified state 132, 134 propagates through the quantum gate 108 also configured for Hadamard transformation and are further adjusted to form output photon pair state consisting of a superposition of 140 and 142 with modal correlation adjusted relative to the quantum state at the input. While the quantum gate 108 operates on frequency bins 104c. 104d, the operation can alter the total state of the entanglement thereby affecting the superpositional portions 136, 138 Thus, at the output, one of the photon pair states 140 in frequency bins 104a, 104c and the other photon pair state 142 in frequency bins 104b. 104d are in superposition with each other. Thus, with the quantum state transformations by the quantum gates 106, 108, a single photon pair is detected, either with a coincidence detection of one photon in frequency bin 104a and one photon in frequency bin 104c, or with a coincidence detection of one photon in frequency bin 104b and one photon in frequency bin 104d (compare with FIG. 4D).

In general, an input quantum state consisting of frequency-encoded qubits is manipulated by the designed network of EOMs and pulse shapers, which applies various unitary operations to combinations of frequency bins. Conceptually, each EOM serves as a frequency mode mixer, while the specific phase patterns applied by each pulse shaper enable either constructive or destructive interference in different frequency bins at the subsequent EOM. The use of EOMs and pulse shapers is thus analogous to the beamsplitters and variable retarders in spatial/polarization optical multiports, with the key difference being that while the standard spatial approach builds on two-mode beamsplitters, each EOM interferes all modes simultaneously. Therefore, a more precise spatial equivalent to each EOM would be a multimode coupler instead of a beamsplitter. Finally, as in the spatial case, feed-forward operations are compatible here as well; after each step in the quantum frequency processor, a subset of modes could be extracted with optical add-drop multiplexers and measured, with the results used to update operations downstream. Note that, although each frequency bin is drawn as a separate "rail" for conceptual purposes, the physical encoding occurs within a single fiber-optic spatial mode, thereby enabling natural phase stability and providing compatibility with current fiber networks. This vision is considerably more broad than our previous experiments on frequency beamsplitters and tritters, for it exploits quantum entanglement (i.e., nonclassical two-qubit, rather than just single-qubit, effects) and realizes different operations in the same device simultaneously, rather than the same operation in parallel over many modes—a valuable, though less general, form of parallelizability.

According to disclosed examples, pairs of distinct quantum gates implemented in parallel satisfy two requirements: (i) their physical implementations must differ only in the spectral phase applied by each, since the temporal modulation is shared by all frequency-bin gates in a single spatial mode, and (ii) they must be able to be realized independently in two frequency bands without crosstalk. These considerations are general, holding for any proposed set of parallel gates. In a disclosed example of a tunable frequency beamsplitter, the two requirements are connected directly to nonclassical phenomena of particular significance in quantum photonics: HOM interference and the Einstein-Podolsky-Rosen (EPR) paradox.

In an existing HOM interferometer, two photons mixed on a 50/50 spatial beamsplitter bunch, never exiting in different output ports. A general feature of bosons, HOM interference forms the basis of essentially all two-qubit gates in linear optics. In our case, the overlap between frequency bins is set by the spectral phase of the quantum frequency processor, so that HOM interference relies precisely on the ability to tune a given operation through spectral phase control alone; in other words, high visibility provides confirmation of requirement (i) above. Similarly, quantum mechanics allows two particles to share a well-defined pure state, even when the individual states of both particles are mixed. This property gives rise to EPR correlations when the joint state of the two particles is measured. While paradoxical to classical notions of reality, these correlations ultimately underpin Bell tests of nonlocality and security in quantum key distribution. Meeting requirement (ii) above signifies the ability to perform independent gates on entangled frequency-bin qubits. In particular, joint beamsplitter operations with different phases enable the realization of all combinations of Pauli Z and X basis measurements, which are sufficient for testing EPR correlations. Consequently, in the following experiments both quantum phenomena (HOM and EPR) are used as important test cases to assess gate performance.

Experimental Results

Figures 2A, 2B:
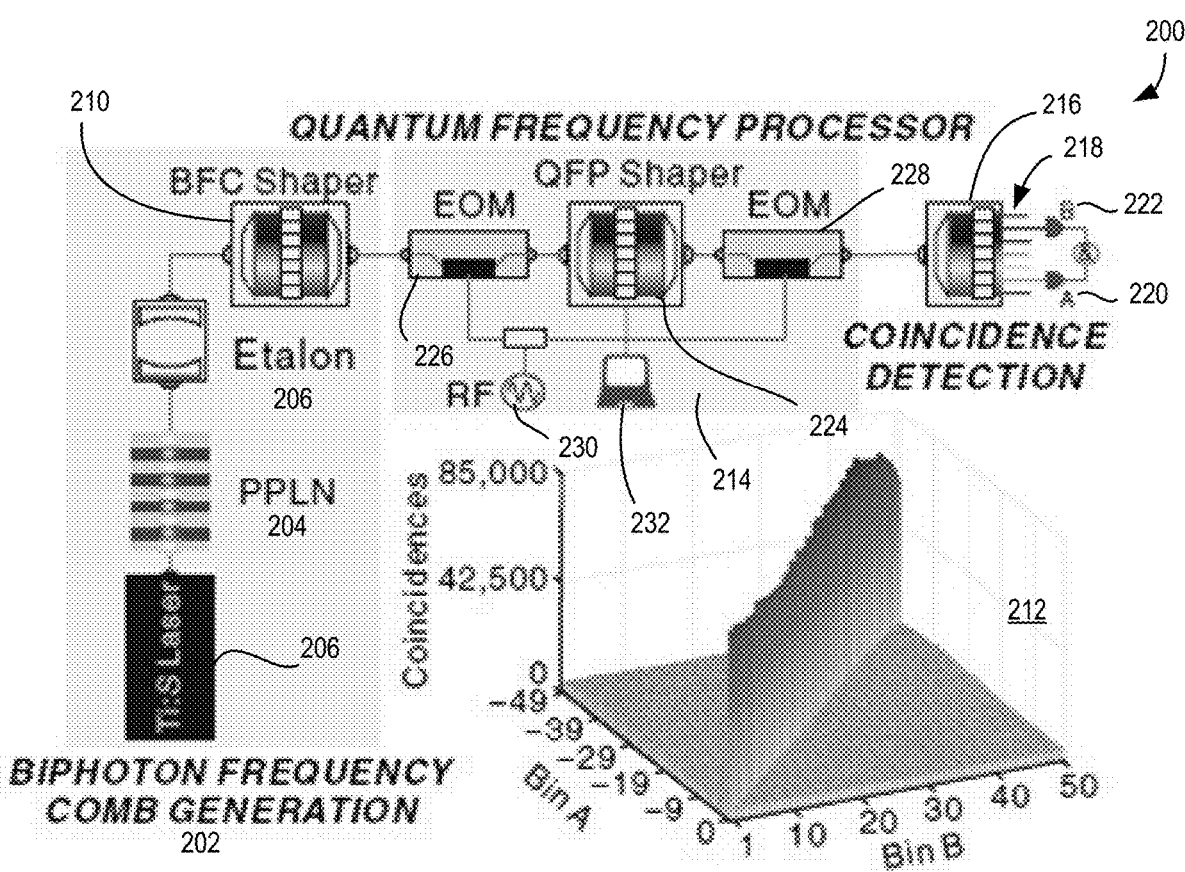
FIG. 2A is an experimental configuration.
FIG. 2B is a joint frequency spectrum of source, measured with etalon output connected directly to coincidence detection setup.

FIG. 2A shows an experimental setup 200 for processing quantum information encoded in frequency. A test source used to provide entanglement was a biphoton frequency comb (BFC) 202 which was configured to generate entangled photon pairs by pumping a periodically poled lithium niobite (PPLN) waveguide 204 with a continuous-wave Ti:sapphire laser 206 and filtering the broadband emission with an etalon 208 to produce entangled photons in a range of frequency bins. The resulting quantum state for the output entangled photon pair is of the form $|\Psi\rangle = \Sigma_{n\geq 1} c_n |1_{\omega_{1-n}}\rangle_A |1_{\omega_n}\rangle_B$, where the coefficients $c_n$ are set by a pulse shaper (BFC shaper) 210. Each frequency-bin index n corresponds to the filter centered at $\omega_n = \omega_0 + n\Delta\omega$, where $\omega_0/2\pi = 193.6000$ THz (International Telecommunication Union channel 36 at 1548.51 nm) and $\Delta\omega/2\pi = 25$ GHz. Party A is assigned all modes $n_A \in \{n \leq 0\}$, while the rest are given to B ($n_B \in \{n \geq 1\}$). FIG. 2B shows a plot 212 of the measured frequency correlations of this source, obtained by bypassing the quantum frequency processor (QFP) 214, scanning the filters 218 of the output wavelength-selective switch 216, and counting coincidences between two detectors 220, 222. Over this 50×50 mode grid, high coincidence counts were observed only for frequency-bin pairs satisfying $n_A + n_B = 1$, in accordance with energy conservation. The quantum frequency processor 214 includes a pulse shaper 224 situated between two electro-optic modulators (EOMs) 226, 228. Each EOM 226, 228 is driven by a 25 GHz sinusoidal voltage from a voltage source 230, while the pulse shaper 224 (e.g., the telecommunications oriented WaveShaper 1000 made by Finisar) imparts a user-defined phase to each spectral bin. The quantum frequency processor 214 enabled a frequency Hadamard gate H with 99.998% fidelity and only 2.61% photon leakage into neighboring modes. A computer 232 was used, and included a processor and memory configured with instructions to execute the various actions performed by the components of the experimental setup 200.

Figure 3A:
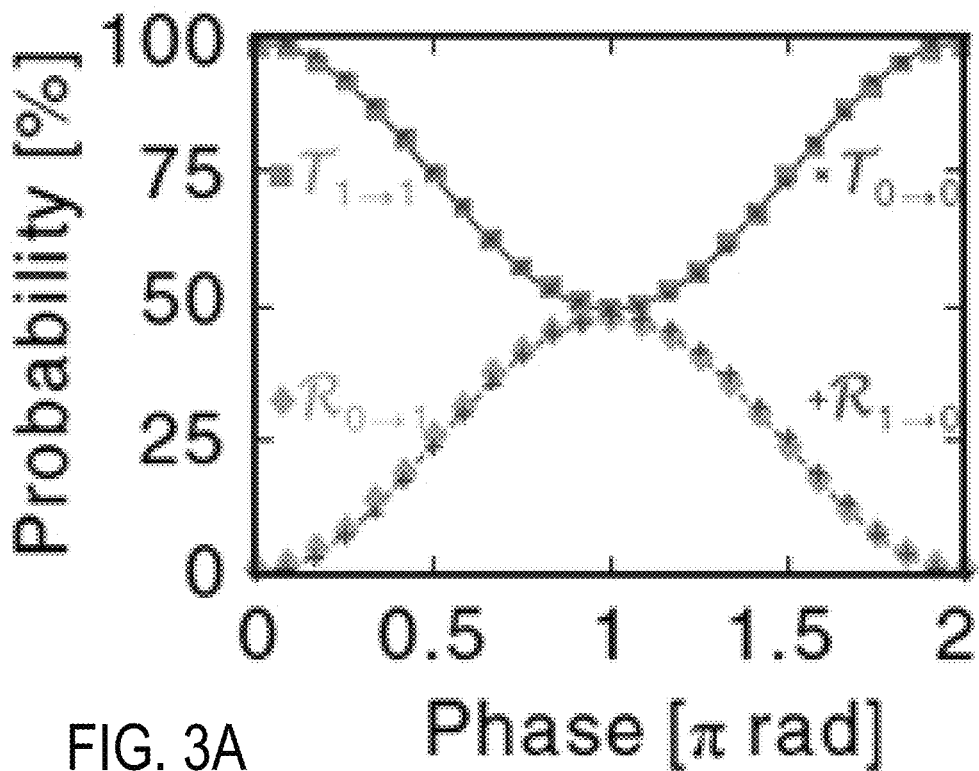
FIGS. 3A-3C are plots of experimental and predicted spectral reflectivity and transmissivity.

By modifying the spectral phase applied by this H gate, or frequency-bin beamsplitter, tunable quantum operation was obtained forming the basis for distinct parallel gates. It was discovered that changing the depth of the phase shift imparted by the pulse shaper 224 between frequency bins 0 and 1 allows the spectral reflectivity R to be tuned smoothly from 0 to ~0.5 and back to 0. FIG. 3A plots the theoretically predicted (curves) and experimentally measured (symbols) beamsplitter transmission and reflection coefficients between frequency bins 0 and 1, when probing the system with a laser and scanning the shaper phase. A phase setting of $\pi$ results in an H gate: 0 and $2\pi$ phase shifts yield an identity operation. Significantly, both EOMs 226, 228 remained fixed throughout the scan, so that the tunability is effected only by adjusting the phase applied by the pulse shaper 224. This controlled reflectivity can be tested directly on quantum states via HOM interference. In general, for HOM, some parameter is scanned that controls the distinguishability of the two-photon probability amplitudes leading to clicks on both output detectors; a visibility exceeding 50% indicates nonclassicality. In the case of photons of different colors, this interference can be realized with a frequency mixer where, e.g., the distinguishability is controlled by introducing a temporal delay between the two input modes or scanning the photon frequency spacing relative to that of the frequency beamsplitter. Here the mixing probability of the operation itself was adjusted, as controlled by the phase scanned in FIG. 3A, analogous to varying the reflectivity of a spatial beamsplitter.

Figure 3B:
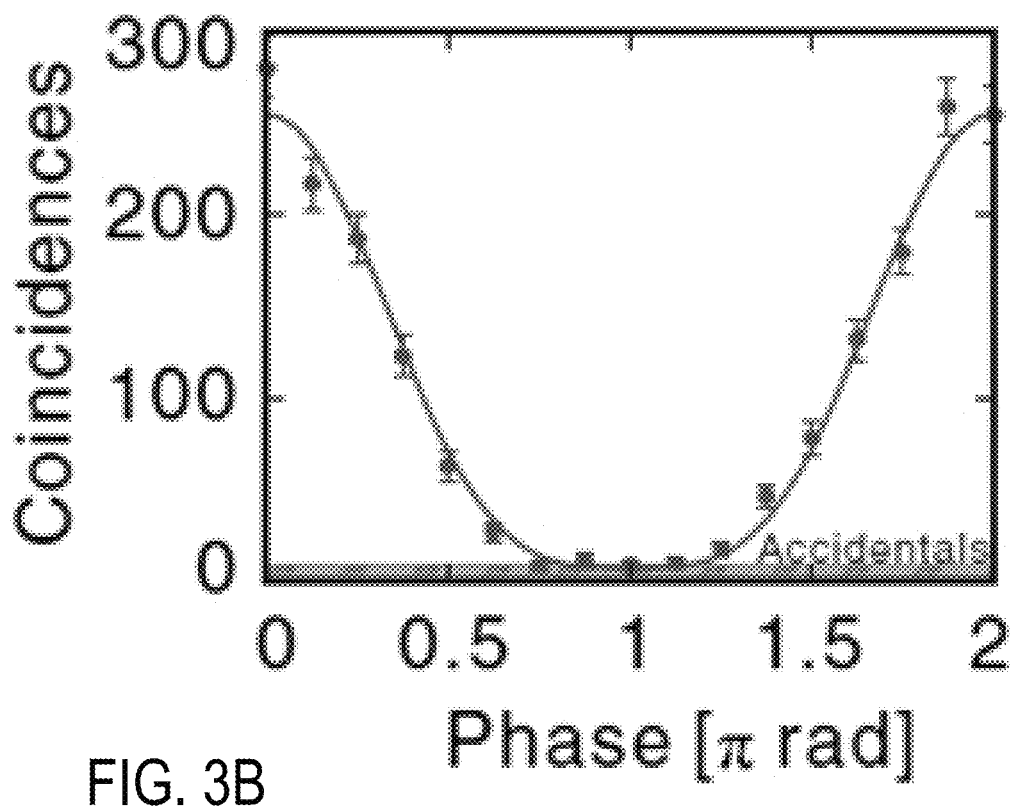

Sending in the photon pair $|1_{\omega_0}\rangle_A |1_{\omega_1}\rangle_B$ and scanning the phase provided by the pulse shaper 224 of the QFP 214, the coincidence counts were measured between output bins 0 and 1, as shown in FIG. 3B. The solid curve is the theoretical prediction, scaled and vertically offset to match the data points via linear least squares; the visibility obtained from this fit is 0.971±0.007, with the reduction from unity completely consistent with the accidentals level expected for the measured counts and timing resolution. This visibility far exceeds the previous values measured for frequency-domain HOM interference without subtraction of accidentals—namely, 0.71±0.04 and 0.68±0.03. Such a significant improvement in visibility can be explained by the reduced optical noise present in electro-optic-based approaches described herein, compared to those relying on powerful pump fields, as well as the fine controllability of provided by the disclosed quantum frequency processing examples, enabled by the purely electrical control parameters (i.e., microwave power, microwave phase, and pixel voltages for the pulse shaper), which allows precise optimization of the spectral overlap between the two modes.

Figure 3C:
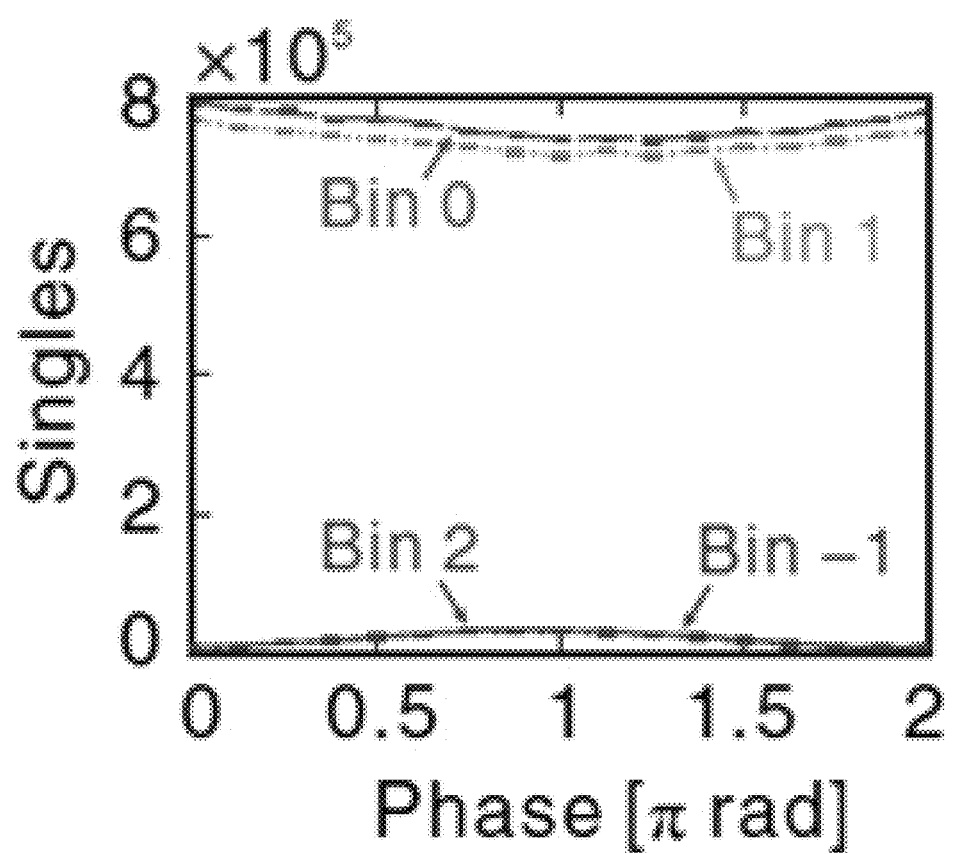

The singles counts for bins 0 and 1 were also recorded, as well as the adjacent sidebands (−1 and 2). As shown in FIG. 3C, the two central modes retain nearly constant flux across the full scan, showing that the dip in coincidence counts results from truly quantum HOM interference as opposed to photon loss. Moreover, the small reduction in singles counts around π—accompanied by the increase in singles counts for bins −1 and 2—also qualitatively matches expectations, given the fact that the full H gate scatters 2.61% of the input photons out of the computational space into adjacent sidebands. However, even this scattering could be reduced or removed by driving the EOMs 226, 228 with other more complicated waveforms. Indeed, the deterministic nature of our tunable frequency beamsplitter sets this HOM experiment apart from alternatives using a single EOM, which can only overlap adjacent bins probabilistically, due to higher-order scattering into sideband modes. While perfectly acceptable for HOM interference per se, such extra scattering proves disadvantageous for general-purpose quantum information processing where HOM interference serves as a building block within larger linear-optical gates. In this context, limiting scattering into extraneous frequency bins can improve performance and result in high success probability.

The tunability of the tested quantum operation, invoked in the above realization of HOM interference, can then be applied to realize two different gates—that is, distinct pairs of R and T in FIG. 3A—by setting different phase shifts on appropriate sub-bands Text 10 in the bandwidth of the pulse shaper 224. To demonstrate this, the BFC shaper 210 was use configured to pass modes {−4, −3, 4, 5} [cf. FIG. 2B], preparing the input entangled state $|\Psi\rangle \propto |1_{\omega_{(-4)}}\rangle_A |1_{\omega_5}\rangle_B + |1_{\omega_{(-3)}}\rangle_A |1_{\omega_4}\rangle_B$. On each pair of frequency bins—{−4, −3} and {4, 5}—the spectral phase was set to apply either the identity 1 or Hadamard H gates and then coincidence counts were measured between the frequency bins at the output. FIGS. 4A-4D furnishes the results for all four combinations of 1 and H. When the two gates match, near-perfect spectral correlations result [FIGS. 4A and 4D], whereas mismatched cases produce uniform population of the two-qubit space [FIGS. 4B and 4C]. By measuring correlations in adjacent bins as well, the self-contained nature of the operation of the quantum frequency processor was confirmed; even in the worst case [FIG. 4D], less than 6% of the total coincidences lie outside of the 2×2 sub-space, whereas similar state manipulation with only one EOM suffers from high probability of qubit scattering. The loss of photon energy to unwanted sideband modes is intrinsic to frequency-bin operations based on a single EOM. Thus, they are inherently nondeterministic and can be viewed at best only as post selected single-photon gates.

While sufficient for the projective-type measurements required in, e.g., state tomography and Bell-inequality tests, such frequency-bin operations cannot be classified as gates in the sense of performing coherent rotations within a fixed input/output Hilbert space. By contrast, the manipulations shown in FIGS. 4A-4D do represent frequency-bin gates in this proper sense, and thus offer potential in constructing more general quantum information processing networks. In particular, because the disclosed frequency-bin operations retain photons in their respective computational spaces, they can be concatenated in systems containing several successive gates, without the massive reduction in success probability inherent to previous approaches.

Figure 4A:
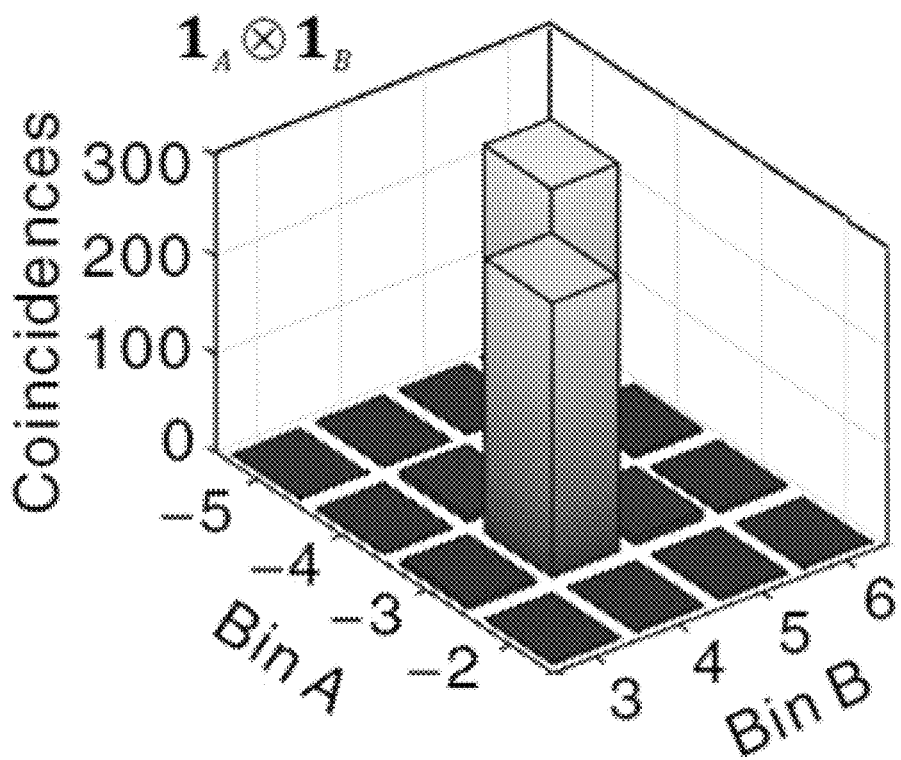
FIGS. 4A-4D are coincidences between output frequency bins.
Figure 4B:
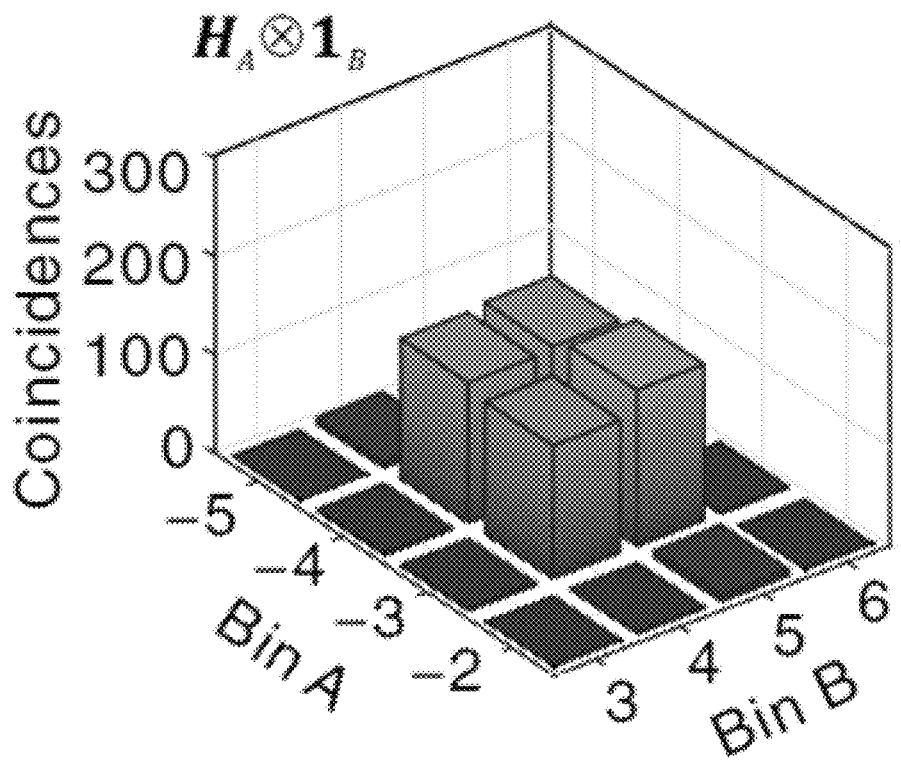
Figure 4C:
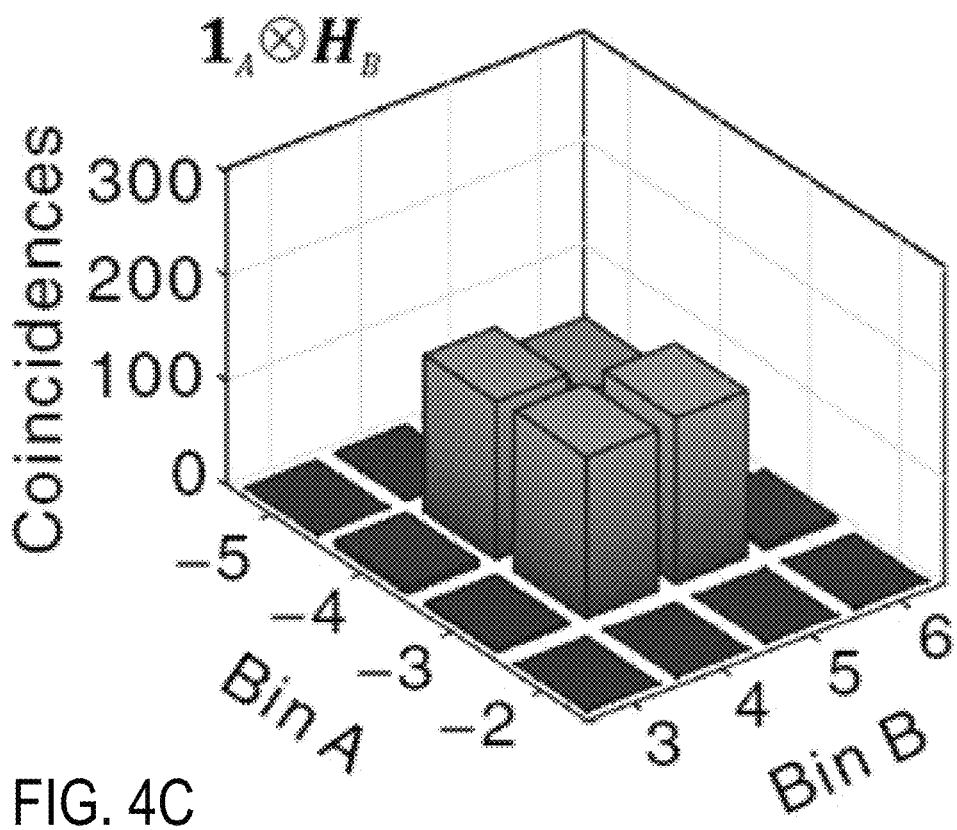
Figure 4D:
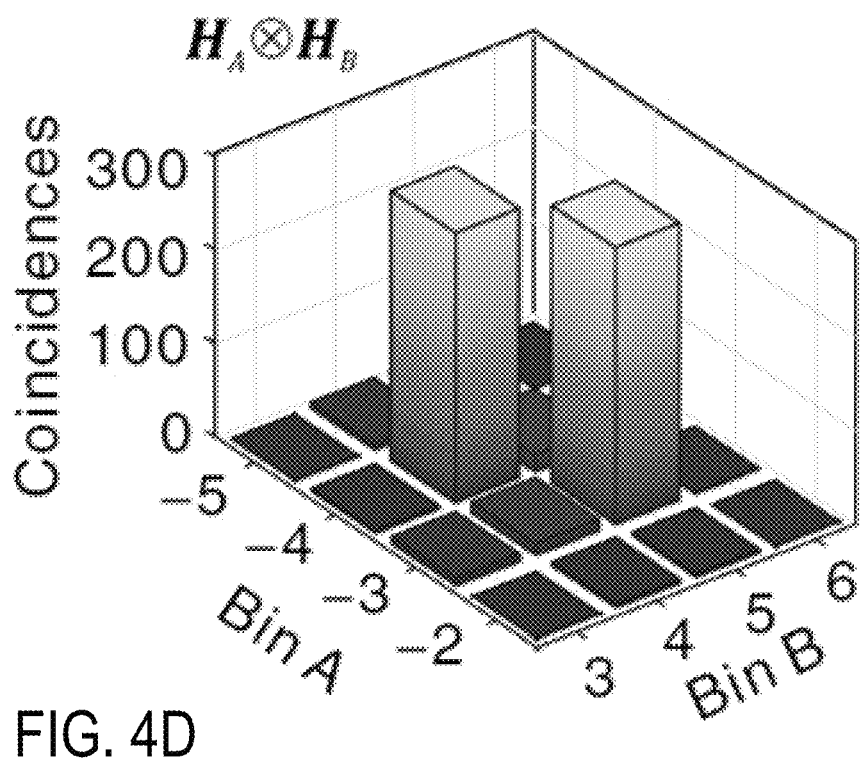

Importantly, the transition from $1_A \otimes 1_B$ [FIG. 4A] to $H_A \otimes H_B$ [FIG. 4D] actually flips the correlations entirely, eliminating the negative frequency dependence resulting from pump energy conservation in favor of a positive dependence. Similar conversion of spectral correlation has been demonstrated for continuous frequency-entangled photons, via nonlinear mixing with a tailored optical pump pulse. In disclosed examples it is demonstrated how the frequency entanglement in discrete bins can be likewise manipulated, now with an electro-optic-based approach. This demonstration of two single-qubit rotations that are closed in the four-dimensional frequency-bin computational space can be used for the ideal two-level logic underpinning qubit-based forms of quantum information processing.

The approach can be extended and scaled so that a plurality of gates can be provided in parallel, including with a single quantum frequency processor having a pulse shaper disposed between first and second EOMs. The frequency dimension can be extended similar to how identical frequency beamsplitters have been realized herein over the entire optical C-band. That is, more general quantum frequency operations can be synthesized over the full ~40 nm pulse shaper bandwidth with negligible reduction in fidelity. Similarly, extending from qubit to higher-dimensional qudit encoding is made possible as well, in which more general d×d frequency-bin gates can be constructed by the same EOM-pulse shaper-EOM setup, but with microwave drive signals consisting of d−1 single-frequency harmonics. While synthesizing many such harmonics places strong demands on the required EOM bandwidth, nonlinear optical mixers can be used to bridge frequency gaps too wide for state-of-the-art modulators.

Bayesian State Analysis

The quality of the disclosed quantum state manipulations can be analyzed by equivalently viewing the unitary rotations on the input state followed by coincidence detection as measurements of the state in bases other than computational. As one example, the EPR-like nature of this state can be tested using the strong correlations in two mutually unbiased bases Z and X (gate operations 1 and H). Conditional entropies $\mathcal{H}(1_A|1_B)$ and $\mathcal{H}(H_A|H_B)$ are defined as the uncertainty of the measured frequency mode of A {−4, −3} given knowledge of B's result {4, 5} for the two cases of matched transformations [FIGS. 4A and 4D]. Retrieving the probabilities from the raw counts via Bayesian mean Estimation (BME) with no accidentals subtraction, the following entropies were recovered: $\mathcal{H}(1_A|1_B) = 0.19 \pm 0.03$ and $\mathcal{H}(H_A|H_B) = 0.29 \pm 0.04$. The entanglement can be quantified by violation of the Maassen-Uffink bound for separable states: $\mathcal{H}(1_A|1_B) + \mathcal{H}(H_A|H_B) \geq q_{MU}$. In the instantiated case, the bound $q_{MU}$ is computed to be 0.971, just smaller than 1 because of slight imbalance in the H operation. With the sum, $\mathcal{H}(1_A|1_B) + \mathcal{H}(H_A|H_B) = 0.48 \pm 0.05$, the $q_{MU}$ bound was thus violated by 9.8 standard deviations, providing a clear witness of entanglement in the experiment quantum state operations.

Figure 5A:
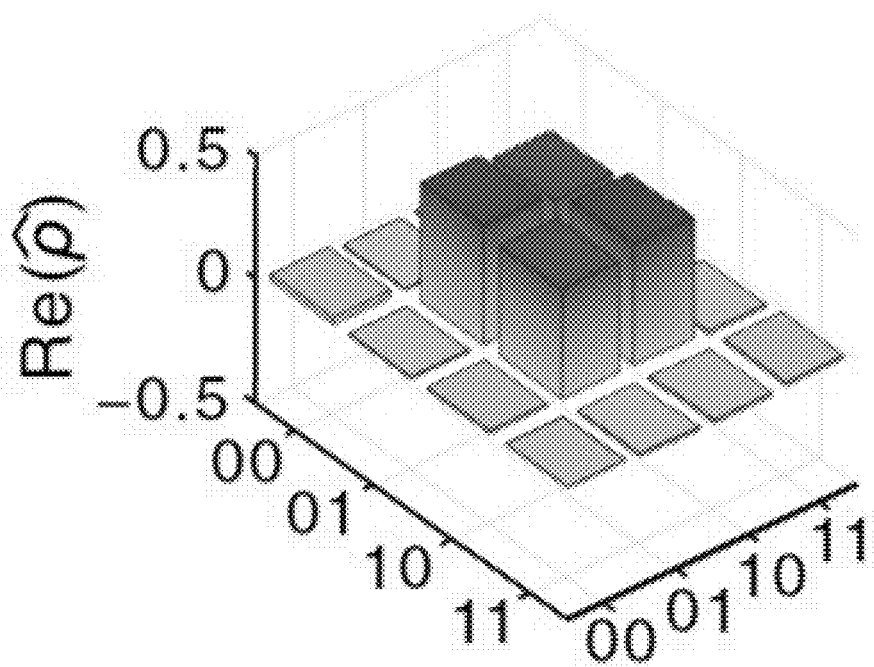
FIGS. 5A-5D are density matrix retrieved by BME.
Figure 5B:
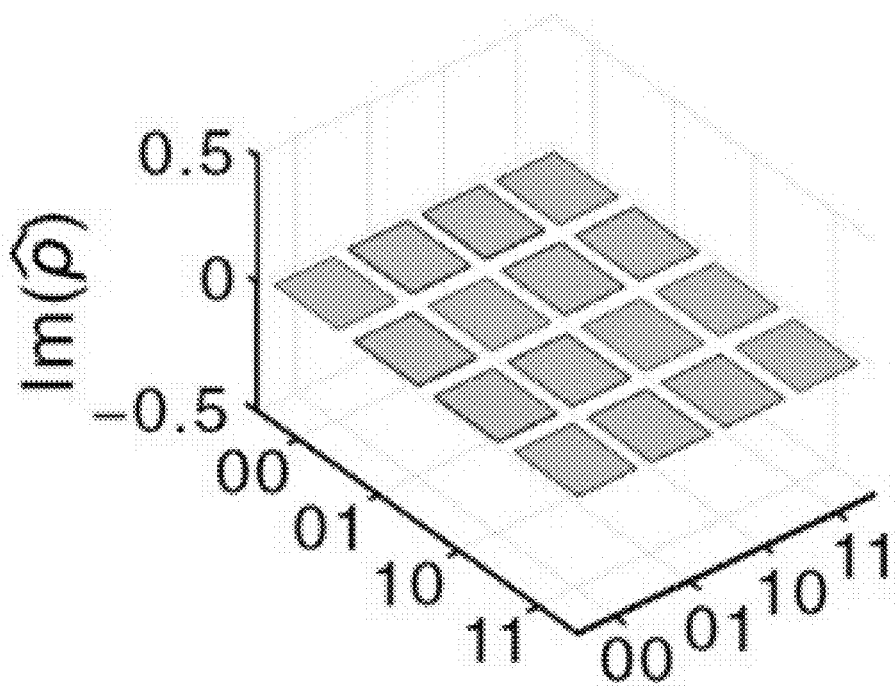
Figure 5C:
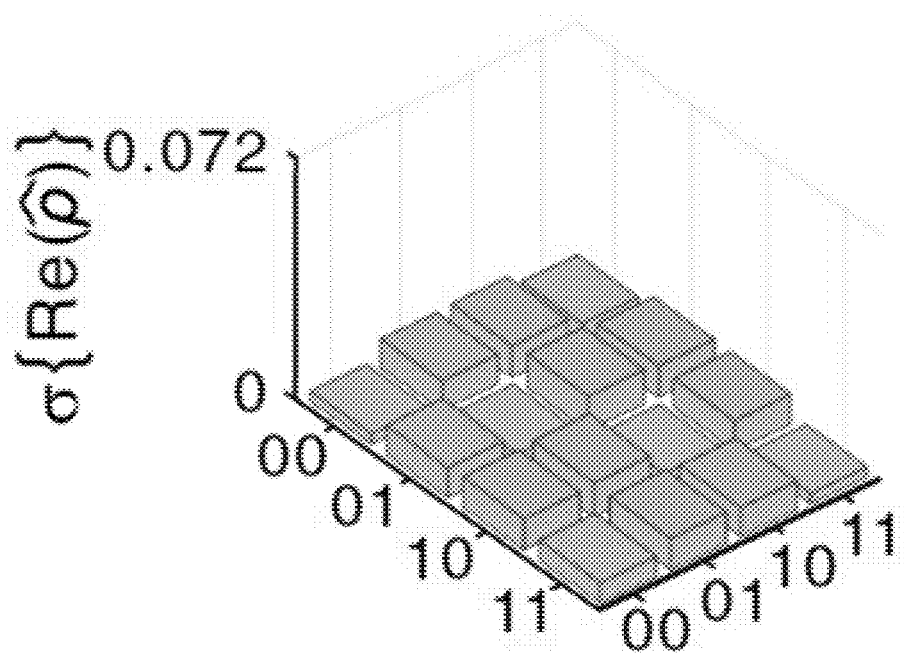
Figure 5D:
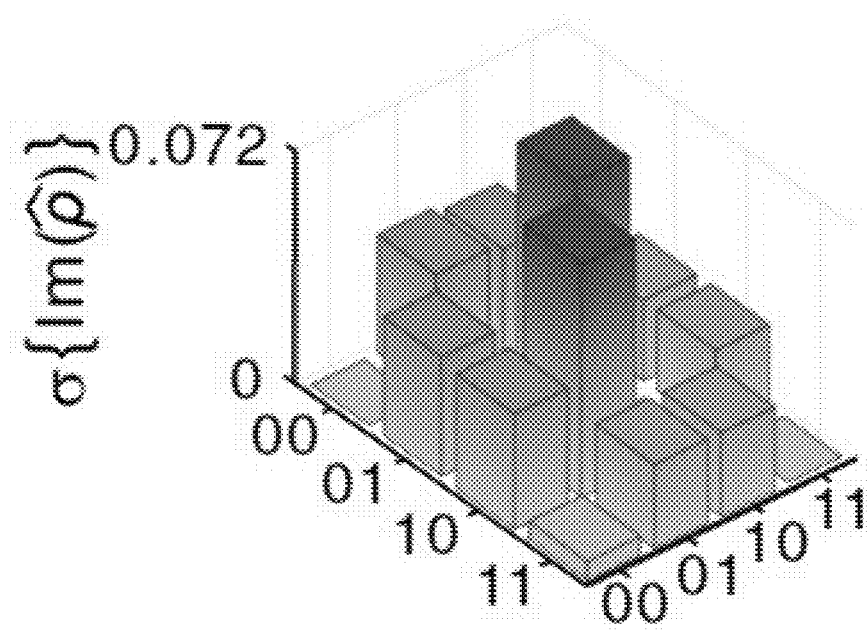

Moreover, BME allows estimation of the full density matrix from just the four measurements in FIGS. 4A-4D, with any missing tomographic information reflected naturally in the retrieved uncertainty. The operations above—1 and H followed by frequency-bin detection—are equivalent to measurements in the Pauli Z and X bases, respectively. Using this information. BME produces the density matrix ρ in FIG. 5: the mean values of the real and imaginary components are plotted in FIGS. 5A and 5B; their associated standard deviations are shown in FIGS. 5C and 5D. The power of Bayesian inference is particularly evident in the error. It is extremely low for the real elements, due to the complete coverage of the Z and X bases, yet much larger on several of the imaginary components, as supported by the absence of results in the Pauli Y basis. Since physical requirements do bound this error, the estimate of the fidelity is still strongly bounded compared to the ideal state $|\Psi^+\rangle \propto |1_{\omega_{(-4)}}\rangle_A |1_{\omega_5}\rangle_B + |1_{\omega_{(-3)}}\rangle_A |1_{\omega_4}\rangle_B$. Specifically, the Bayesian estimate is $\mathcal{F}=\langle\Psi^+|\rho|\Psi^+\rangle=0.92\pm0.01$. This result positively corroborates the frequency-bin control of disclosed examples herein and is fairly conservative, given that: (i) dark counts are not removed and thus can degrade the state, and (ii) any imperfections in the system are intentionally lumped onto the state itself, so that impurities in either the input state or quantum frequency processor will contribute to a lower $\mathcal{F}$. The experimental results demonstrate the successful operation of disclosed quantum frequency processors, which can be used to manipulate joint quantum systems coherently and independently, preserving a state's built-in entanglement in the process—an essential functionality in some examples of frequency-bin qubit control.

Quantum Key Distribution Examples

Figure 6:
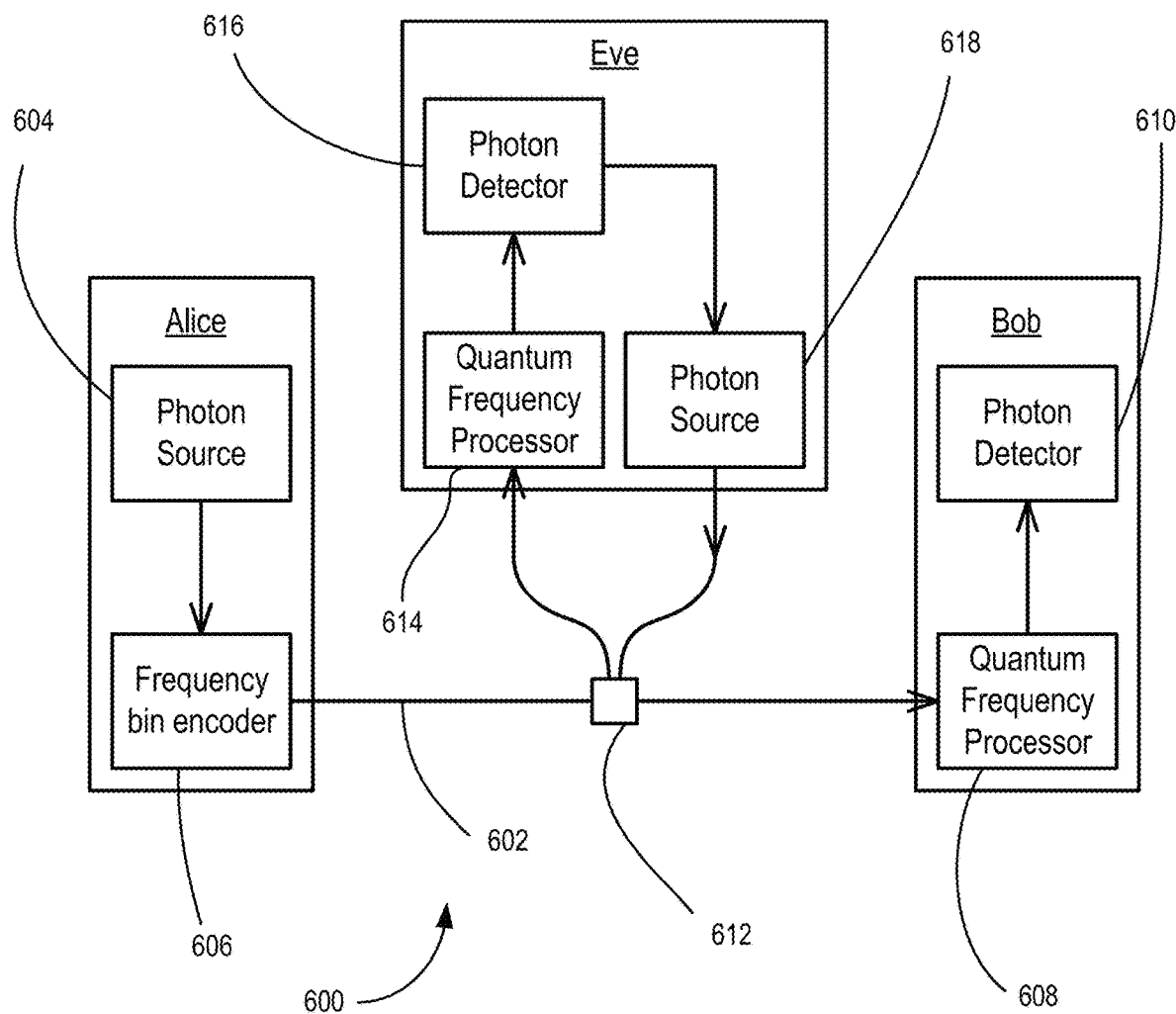
FIG. 6 is a schematic of a quantum key distribution network.

FIG. 6 shows an example quantum key distribution network 600 using the traditional notation of "Alice" the sender, "Bob" the receiver, and "Eve" the eavesdropper. In representative examples, Alice and Bob can send secure communications using one or more QKD protocols (such as BB84, etc.) over a public communication network 602, such as a long distance fiber-optic network, by using frequency-encoded quantum bits (qubits). Some examples of disclosed frequency bin QKD approaches are similar in some respects to using perpendicular polarizations as computational basis 0 and 1 bit values in a first measurement basis (e.g., horizontal/vertical) and perpendicular polarizations as computational basis 0 and 1 bit values in a second but nonorthogonal measurement basis (e.g., ±45°), but with computational basis 0 and 1 bit values corresponding to the presence or absence of a photon in a frequency bin and with the nonorthogonal bases corresponding to Identity and Hadamard measurement bases.

For example, in line with the BB84 protocol, Alice can use a photon source 604 to generate a photon with predetermined frequency characteristics, such as a photon defined by a single frequency mode. The photon can then be received by Alice's frequency bin encoder 606 (which can be a quantum frequency processor in some examples) and Alice can randomly adjust the photon's quantum state to form a qubit, such as by transforming the photon into a superposition of two frequency bins with a Hadamard operation. The encoded photon is then directed through the public communication network 602 to Bob who randomly selects a measurement basis for the photon and uses his quantum frequency processor 608 to adjust the quantum state of the photon based on the selected measurement basis. For example. Bob can use a Hadamard gate of the quantum frequency processor 608 to convert a quantum state defined as a superposition of two frequency bins created by Alice to a quantum state with the photon in a single frequency bin, based on the Identity operation that results from the application of the series of two Hadamard gates (one by Alice and one by Bob). Bob can then use a photon detector 610 to detect the photon in the correct quantum state that matches Alice's encoding (though he will not immediately know that it is correct). Bob could have instead randomly selected to use an Identity gate of the quantum frequency processor 608 as the measurement basis. Bob would have detected the same photon with the photon detector 610 as belonging to a frequency bin, but the detected bin would have about 50% chance of matching the correct bin according to Alice's original frequency bin encoding. Similarly, Alice could have used an Identity gate of her quantum frequency processor 606 to define the quantum state of the transmitted qubit in a single frequency bin. Bob's random selection into a Hadamard measurement basis would result in about 50% chance of matching Alice's original frequency bin encoding whereas Bob's alternative selection of an Identity measurement basis would have resulted in the correct measurement.

Alice and Bob can together create a raw quantum distribution key from the encoded and measured photons using the respective random encoding and random measurement bases. Bob can report to Alice over the public communication network 602 the measurement bases he selected and Alice and Bob can proceed to sift the raw key and remove results that do not match with Alice's encoding bases. Alice can select a subset of bits of the sifted key and compare the values to Bob's detected values using the public communication network 602 to determine a quantum bit error rate and the corresponding extent of the correlation of their results, and they can determine from the errors whether an eavesdropper Eve might have interfered with the transmission. For example, Eve can intercept the transmission from Alice to Bob by rerouting Alice's photons with a network tap 612. Eve can use her own quantum frequency processor 614 to apply a selected quantum state transformation based on a selected measurement basis, such as an Identity or Hadamard transformation, to an incoming photon from Alice. Eve can then detect the photon with her photon detector 616 and based on the detected frequency bin, produce a clone with a photon source 618 and direct the cloned photon back through the network tap 612 and on to Bob via the public communications network 612. However, because of the no-cloning theorem, Eve's intercept-resend fails some of the time. Eve's eavesdropping measurements disturb the quantum state sent by Alice and received by Bob, increasing the quantum bit error rate to reveal the interference. Thus, the quantum key distribution between Alice and Bob can be made provably secure.

Figure 7:
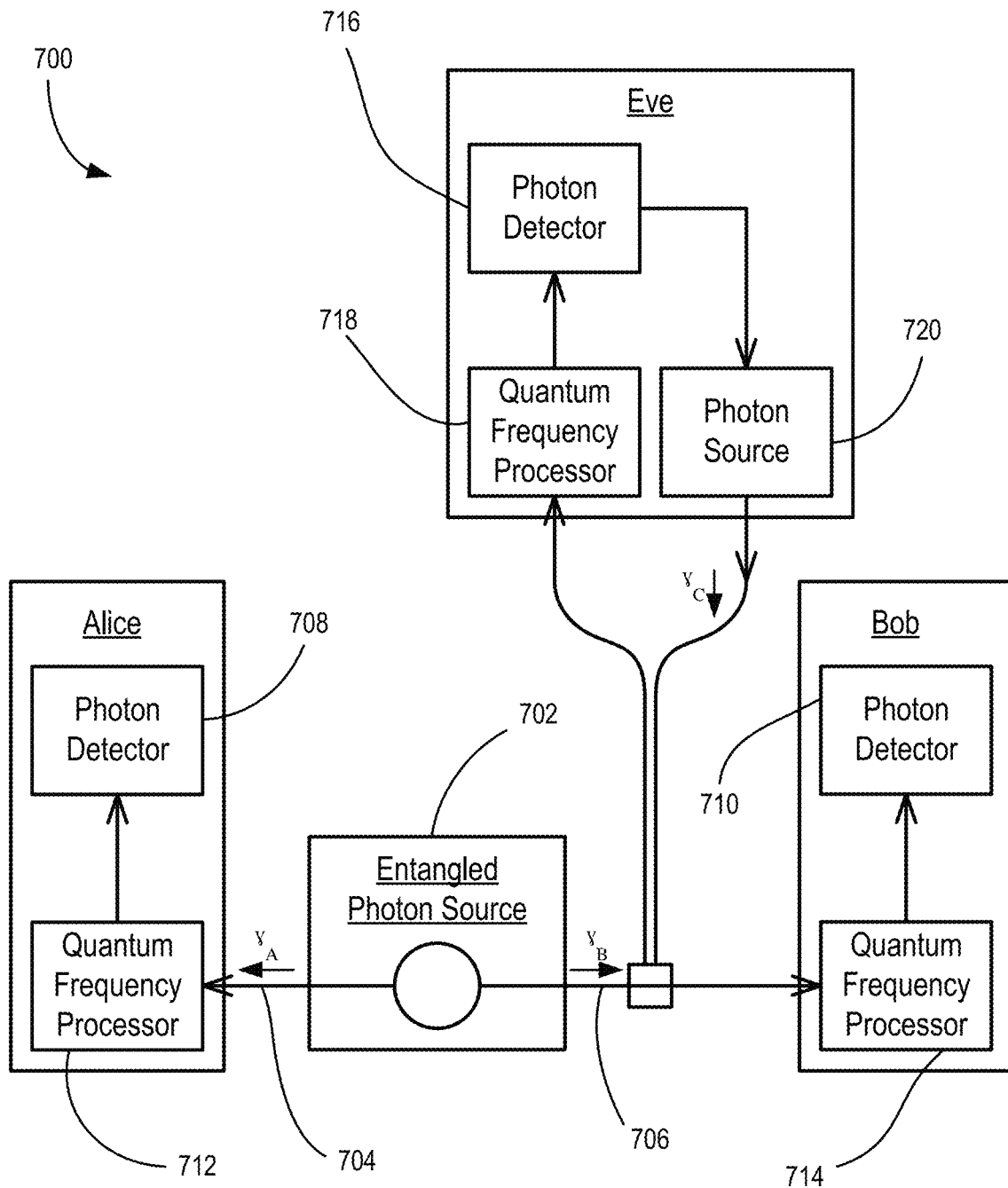
FIG. 7 is a schematic of another quantum key distribution network.

FIG. 7 shows an example quantum key distribution network 700 using entangled-states of photons. In representative examples, Alice is attempting to establish a quantum key with Bob so that Alice can send secure communications to Bob encrypted with the quantum key. To generate the quantum key, a sender 702 includes an entangled photon source (e.g., a biphoton frequency comb) that produces photon pairs in a frequency-bin entangled state and directs one of the photons, photon A, along an optical path 704 to Alice, and the other of the photons, photon B, along an optical path 706 (typically a public communication path) to Bob. In some examples, the sender 702 can be situated a substantial distance from Alice and Bob, though in other examples the sender 702 can be local to Alice. In typical examples, the sender 702 generates the photon pairs in their entangled states without specifically encoding the frequency bins of the pairs. For example, the sender 702 can send the same entangled state repeatedly, and the receivers can obtain correlations based on the entanglement. For example, Alice can use a photon detector 708 to measure a frequency of photon A, and Bob can use a photon detector 710 to measure a particular frequency for photon B. Because the photons are entangled, Bob will obtain a well determined frequency for photon B. Thus, the network 700 can be seen to be similar to the network 600, except that Alice's detection of her photon A effectively defines Bob's photon in a given state due to the entanglement and violation of Bell's inequality. To obtain quantum key values and correlated results, Alice and Bob each have quantum frequency processors 712, 714 which can be independently configured to select a frequency bin measurement basis (e.g., identity or Hadamard). After removing values determined using incorrect measurement bases, Alice and Bob can form a quantum key based on a subset of the sifted key values and a sufficiently low quantum bit error rate. If Eve were to eavesdrop by redirecting photon B, detecting with a photon detector 716 and Eve's measurement basis chosen with her own quantum frequency processor 718, generating her own photon, photon C, with a photon source 720, and sending photon C to Bob along the public channel 706, Alice and Bob will find a high quantum bit error rate and uncorrelated results in their QKD key values.

While examples are described in relation to the BB84 protocol, it will be appreciated that frequency-bin qubit encoding and decoding may be applied to various other QKD protocols including but not limited to T12, SARG04, E91, BBM92, MSZ96, COW, DPS, KMB09, HDQKD, etc. Described frequency bin qubit encoding can also include encoding with additional quantum state parties to generate complex quantum states with multiple independent subsystems and increased system dimensionality, including phase, time, phase-time, multiphoton, hyper-entanglement, etc.

Figure 8:
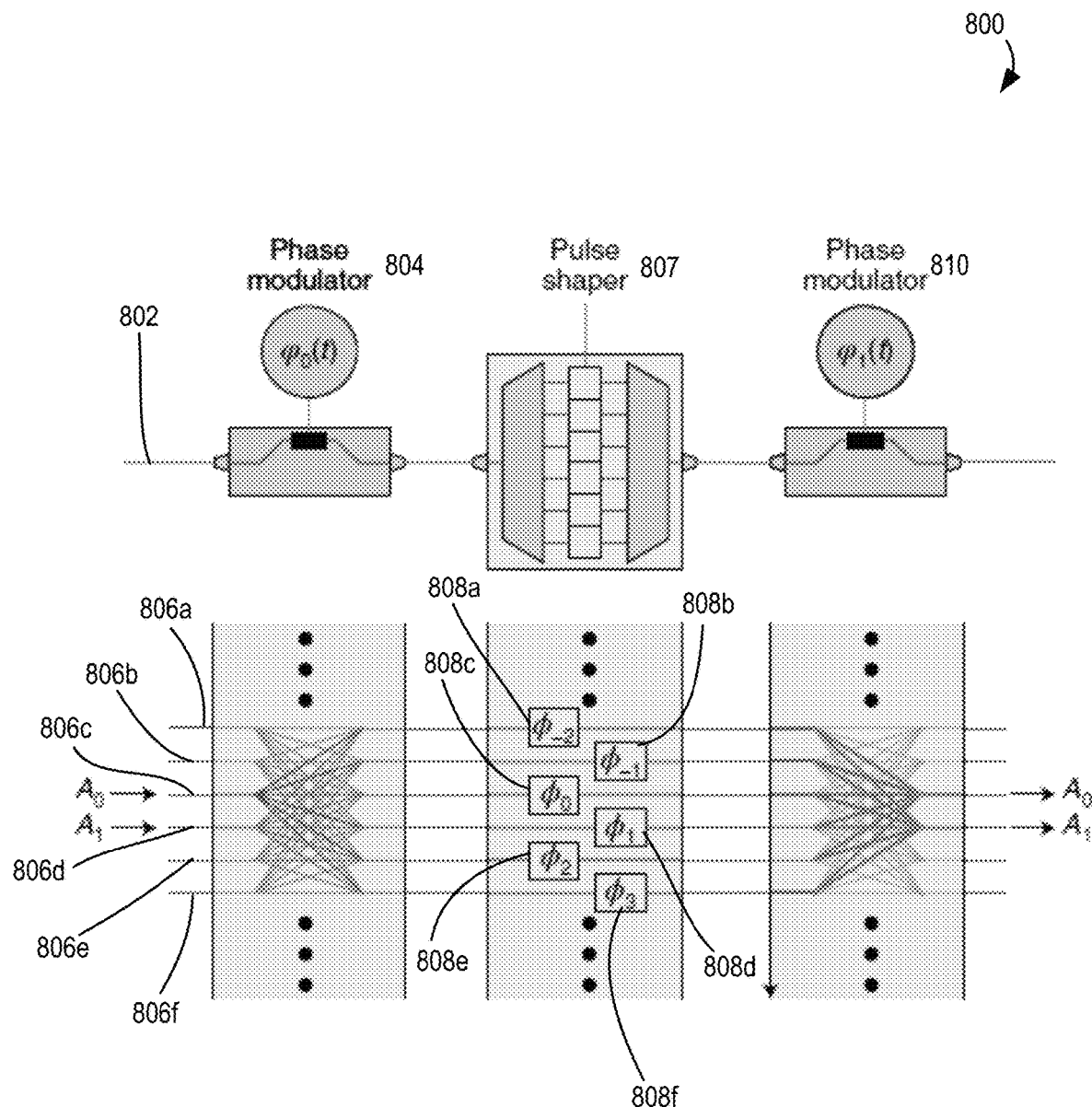
FIG. 8 are schematics of a quantum frequency processor during operation.

FIG. 8 shows an example of a quantum frequency processor 800 configured to receive and perform quantum state operations on a frequency bin photon 802. In representative examples, the quantum frequency processor 800 includes a first frequency mixer, typically in the form of an electro-optic phase modulator 804. For example, the electro-optic phase modulator 804 can be configured to be driven with a predetermined waveform (typically sinusoidal) that causes incident frequency modes, such as $A_0$ and $A_1$, propagating in frequency bins 806c, 806d respectively, to mix into several adjacent frequency bins 806a, 806b, 806e, 806f. A pulse shaper 807 is situated to receive the frequency mixed modes in the frequency bins 806a-806f and to apply a selectable phase shift (or filter) 808a-808f controllably to each of the frequency bins 806a-806f.

When electro-optic phase modulators are driven by an RF voltage commensurate with the frequency-bin spacing (e.g., the free spectral range FSR of the resonator used to produce the frequency bin characteristics of the photons received by the EOM, such as a resonator used for generating directly or a cavity filter post-generation), the resulting frequency sidebands allow adjacent frequency bins to overlap—analogous to a multimode beamsplitter. However, due to the symmetric nature of electro-optic modulation driven by a single sinusoidal frequency, any operation designed to interfere adjacent frequency bins also produces unwanted sidebands outside of the frequency modes of interest. For example, while it is desired to mix frequency modes $A_0$ and $A_1$, as noted above mixing also occurs into frequency bins 806a, 806b, 806e, 806f. Such 'spectral scattering' can fundamentally limit the success probability of single-modulator based quantum state operations, as well as probabilistic frequency-domain Hong-Ou-Mandel interference. In such instances, projections are permitted onto various frequency superpositions, but because of the intrinsic scattering loss, non-unitary gates are formed in the sense of not transforming qubits within a common input-output computational space. In accordance with disclosed examples, spectral scattering is reduced or eliminated by cascading phase modulator/pulse shaper pairs. For example, after exiting the pulse shaper 807, the frequency modes in the frequency bins 806a-806f can be coupled back into a common optical path and be received by a second frequency mixer 810. Such cascading can be used in the context of spectral linear optical quantum computation, to synthesize frequency-bin unitary transformations via a series of temporal and spectral phase operations. As shown, the sequence generates probability amplitudes that are initially scattered outside of the encoding space by the first frequency mixer 804 are then caused to return into the encoding space (such as frequency bins 806b, 806c) with the frequency mixer 810 before exiting the gate of the quantum frequency processor 800.

Figure 9:
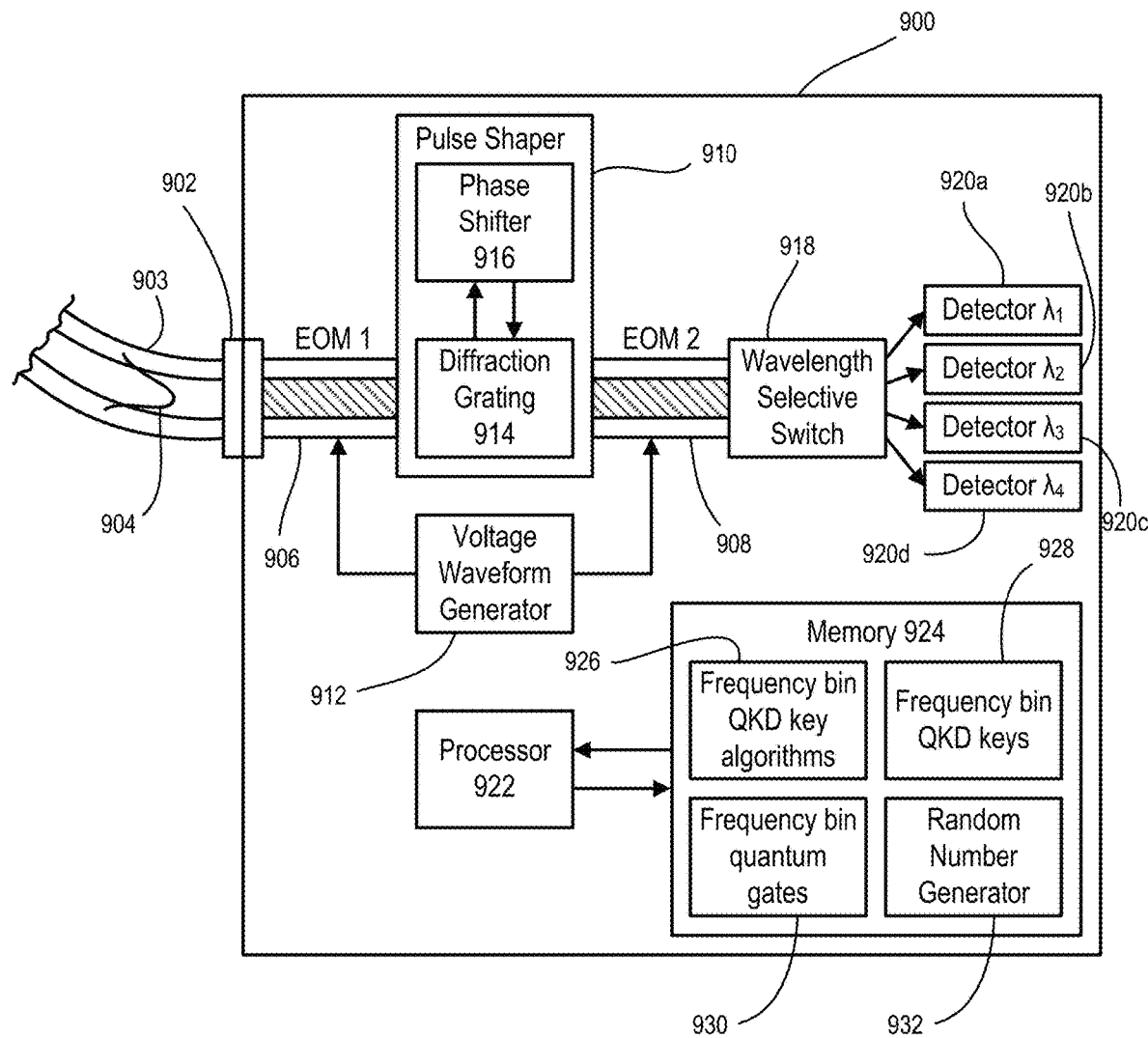
FIG. 9 is a schematic of a quantum key distribution receiver unit.

FIG. 9 is an example quantum key distribution receiver unit 900 which can be used by QKD senders and/or receivers. In some examples, the receiver unit 900 can include integrated photonics components. In selected examples the receiver unit 900 is configured fit within a 19" rack mount. The receiver unit can include an input port 902 configured to receive a single-mode optical fiber 903 transmitting one or more frequency bin qubit photons 904. The photons 904 are transmitted in single and/or multiple different frequency modes in a single spatial mode along a single-mode core of the optical fiber 903, simultaneously (e.g., for parallel key generation or other quantum processing) and/or with temporal delays. In some examples, the photons are transmitted through free-space (e.g., through satellite) or with multi-mode fibers configured to compensate for modal dispersion. The photons 904 can be sent from a distant sender, such as by Alice in single-photon QKD examples or a distinct separate network node (or by Alice) generating entangled photon pairs in entangled two-photon QKD examples. In some examples, the receiver unit 900 can also correspond to a unit used by Alice to measure received entangled photons from a distant location or to measure locally produced entangled or single photons. Additional transmit optical fibers or other network communication inputs and outputs (e.g., wired or wireless communications) can also be provided, including for carrying out various QKD tasks, including bit or measurement basis publication and comparisons, error correction, noise assessment, and privacy amplification, by way of example. Non-limiting examples of privacy amplification include using the leftover hash lemma and comparing the difference between Alice and Bob's mutual Shannon information to produce a shorter key of which Eve would have almost no information. In some examples, Alice and Bob can replace selected bits with XOR values to reduce the length of the key without introducing errors. The reduction also further reduces the knowledge Eve has of the key values as Even might only have partial information about the two bits and with the replacement she will have even less information.

The QKD receiver unit 900 can include first and second electro-optic modulators 906, 908 and a pulse shaper 910 situated between the first and second electro-optic modulators 906, 908 configured to operate as a quantum frequency processor, e.g., by providing one or more quantum gate operations to provide basis state transformations to one or more of the frequency bin qubit photons 904 corresponding to selected measurement bases. During operation, the first electro-optic modulator 906 receives the photons 904 and applies a frequency-bin mixing operation to the photons 904 through a sinusoidal (or other shaped) voltage application received from a voltage waveform generator 912. In representative examples, the sinusoidal frequency produced by the voltage waveform generator 912 corresponds to a frequency bin spacing associated with the photons 904. Suitable electro-optic modulators can be fiber-coupled and perform electro-optic modulation across fiber-optic or other waveguides to produce the desired frequency mixing effect. The mixed photons 904 are directed to the pulse shaper 910 which can include various components, such as a diffraction grating 914 configured to disperse the frequency bin components of the photons 904 and a phase shifter 916 (e.g., liquid crystal on silicon) configured to selectably apply phase shifts to the photons 904, typically corresponding to one or more quantum gate operations (such as Pauli X, Pauli Y, Pauli Z. Hadamard, Phase, CNOT, SWAP, Toffoli, etc.). The phase-shifted and mixed photons 904 are coupled back into a single-mode optical fiber and received by the second electro-optic modulator 908, which can be driven by the same voltage waveform generator 912 or a different one providing an identical or different waveform, to collect frequency sidebands scattered outside of the gate operation and complete the gate operation. A wavelength selective switch 918 or other demultiplexer can be situated to receive the photons 904 from the electro-optic modulator 908 and to controllably select and/or disperse the frequency modes of the photons 904 so that one or more optical detectors (e.g., APDs, photodiodes, etc.) 920a-920d can receive and detect the photons 904. It will be appreciated that various other quantities and/or types of optical detectors may be used for different frequencies and/or coincidence measurements. In some examples, different frequency bins or groups of bins can correspond to different quantum keys or different values for a quantum key. Examples can include receiving frequency bin photons simultaneously (e.g., in a pulse packet), with the quantum frequency processor applying selected basis state transformations to different frequency bins in parallel. By applying such transformations in parallel, the throughput of quantum key distribution key transmissions and qubit processing can be dramatically increased. Furthermore, using the quantum frequency processor to apply the transformations across a range of frequency bins can allow the use of classical wavelength-division multiplexing devices and techniques and therefore rapid implementation of such a vastly increased overall communication rate. As discussed above, an example of 33-qubit parallelization could yield a 33× improvement in overall speed, which can produce a 33× faster response time to cyber threats, compared to single-channel QKD. Thus, representative QKD examples of the disclosed technology using QFPs can advantageously allow integration into existing fiber networks and infrastructure while providing an improved overall secure key rate via frequency parallelization. Of particular benefit can include existing single-mode optical fibers that can be configured to propagate frequency-bin photons and associated qubits (and qudits) over substantial distances.

The receiver unit 900 can include various computing devices and/or controllers such as one or more processors 922 and memories 924 configured to execute QKD protocols and control operation of quantum frequency processing, encryption, and decryption. Example computing devices can include desktop or laptop computers, mobile devices, tablets, industrial control systems, programmable logic controllers (PLCs), systems-on-a-chip, etc. The processor 922 can include one or more CPUs, GPUs, ASICs, FPGAs, MCUs, PLDs, CPLDs, etc., that can perform various data processing or I/O functions associated with quantum key distribution. The memory 924 can be volatile or non-volatile (e.g., RAM. ROM, flash, hard drive, optical disk, etc.) and fixed or removable and is coupled to the processor 922. The memory 924 can provide storage for various processor-executable logic instructions and program modules which when executed by the processor 922, cause the receiver unit 900 to process incoming QKD frequency bin photons, generate keys, and decode encrypted messages. For example, the memory 924 can include frequency bin QKD algorithms 926 on the received photons, such as various QKD protocols and related processes. The memory 924 can also include frequency bin quantum gate configurations so that the processor 922 can control the EOMs 906, 908 and pulse shaper 910 to apply quantum gate operations on various frequency bins. The memory 924 can also include a random number generator 930 that can select the various quantum gate operations to be applied on the incoming photons 904. QKD key values can be assigned based on detection signals from the detectors 920a-920d and QKD keys 928 can be formed and stored in the memory 924. While the receiver unit 900 is generally described as being suitable for a receiver (such as Bob) in relation to receiving a QKD key and encrypted message from a sender source (such as Alice), the receiver unit 900 can also be configured in a sending configuration in some examples. For example, a photon source can be included in the receiver unit 900 that can generate single or entangled photon pairs for sending along the optical fiber 903 to a distant location, or the receiver unit 900 can be configured to receive a photon of an entangled pair generated at an intermediate location (local or distant). Photon sources can include frequency comb sources configured to encode frequency bin qubits in selected quantum states, typically according to QKD protocols, such as by using the random number generator 930 (which is independently random between senders and receivers).

Figure 10:
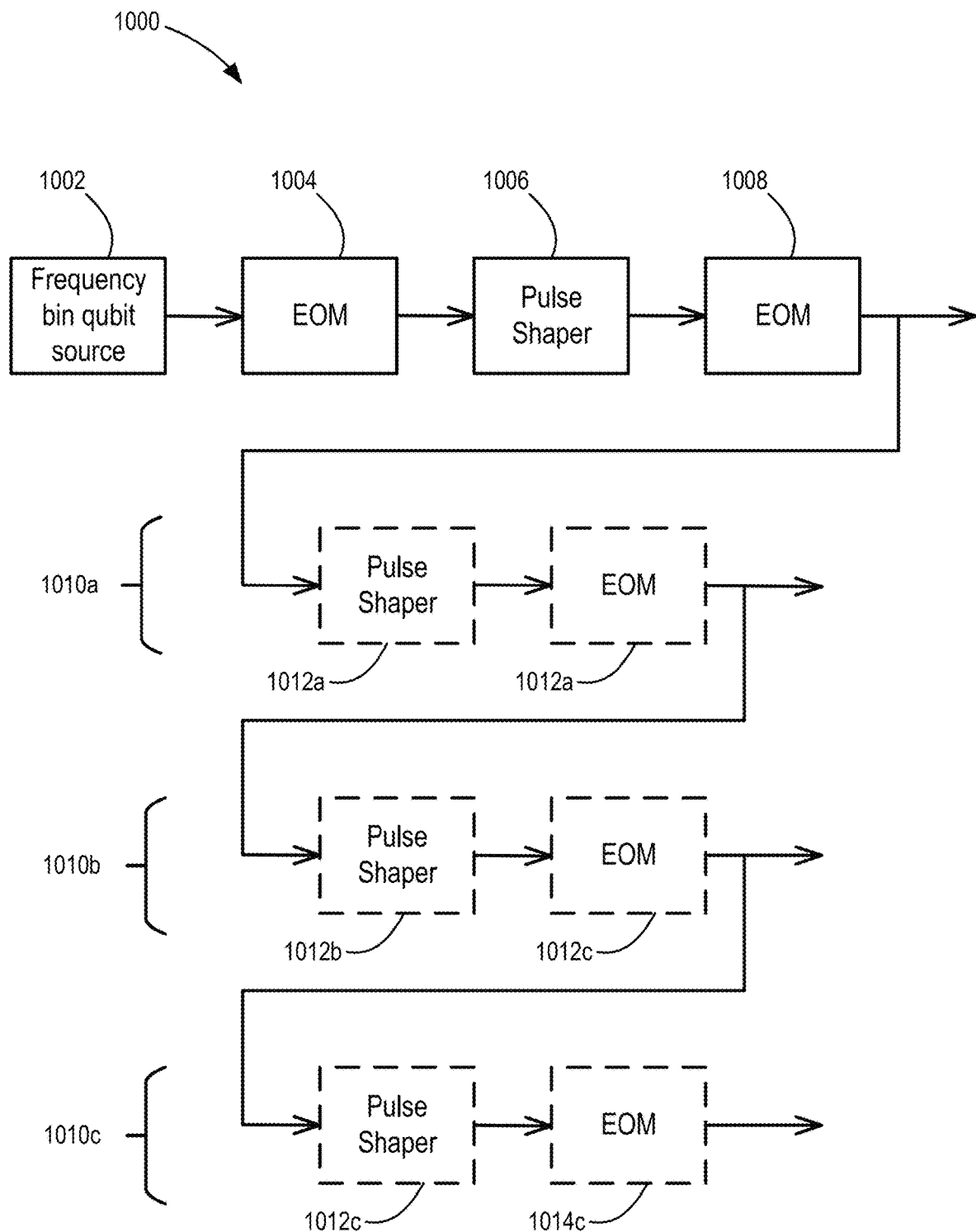
FIG. 10 is a schematic of an example quantum frequency processor.

FIG. 10 shows an example quantum frequency processor 1000 that includes a frequency bin qubit source 1002 configured to provide frequency bin qubits. The qubits are coupled to a sequence of a first EOM 1004, a pulse shaper 1006, and a second EOM 1008, that can together apply one or more parallel quantum gate operations to the received qubits. The qubits can be output and detected or can be directed to one or more of a series of quantum frequency processor gates 1010a-1010c each having a respective pair of pulse shapers 1012a-1012c and EOMs 1014a-1014c. Frequency mode qubits can be output after a selected gate 1010a-1010c, e.g., with a wavelength selective switch, for detection in a computational basis. Any number of gates can be provided, each being independently controlled, with the quantity limited generally by insertion losses associated with the number of pulse shapers, EOMs or other photonics components arranged in series.

Figure 11:
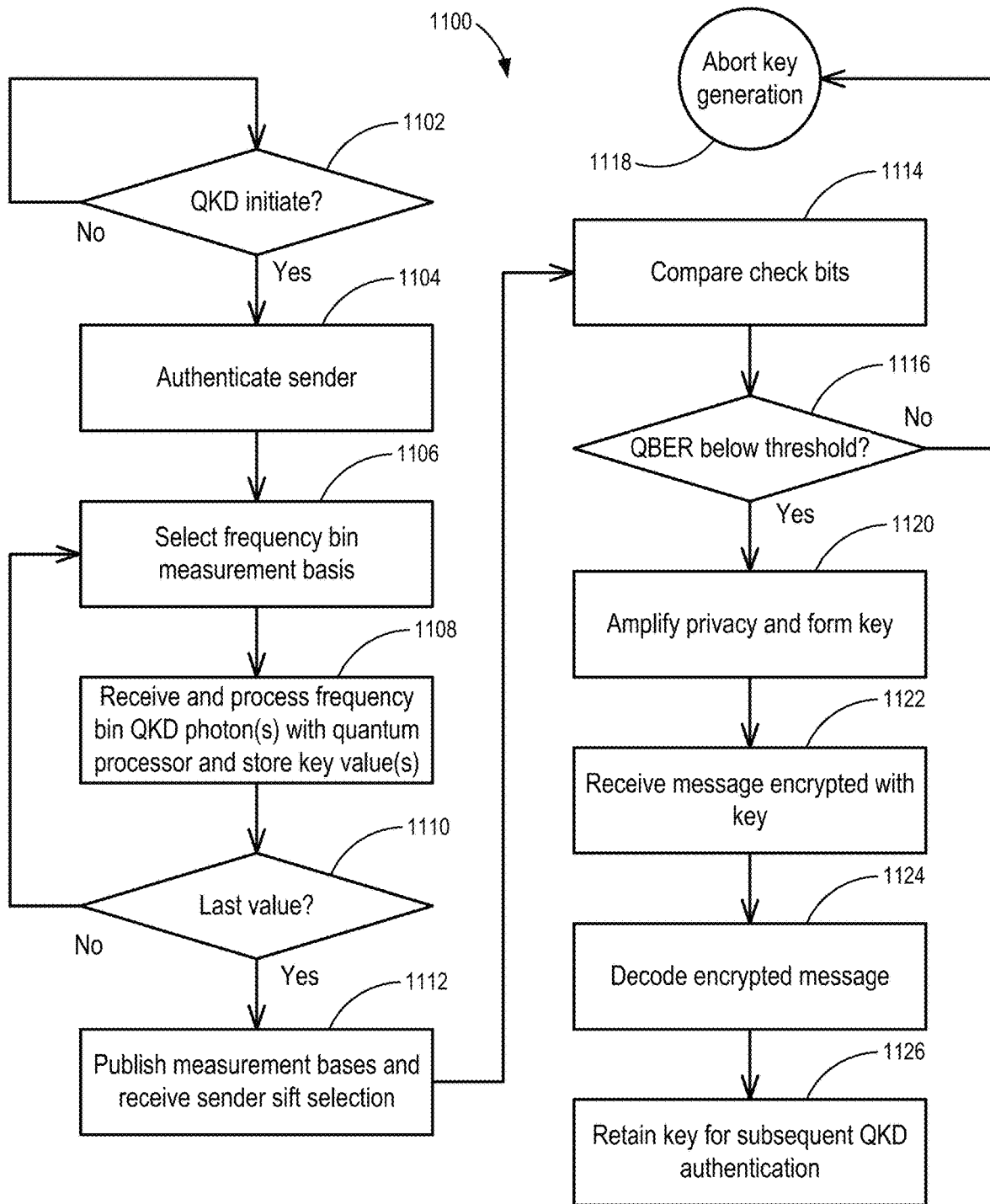
FIG. 11 is a flowchart of an example quantum key distribution process.

FIG. 11 illustrates an example method 1100 of producing a provably secure quantum key through frequency bin quantum key distribution between a sender and receiver (e.g., Alice and Bob). At 1102, a receiver can be listening for a QKD key request over a public or dedicated QKD channel. e.g., through single-mode optical fiber configured to transmit QKD frequency bin qubits, fiber optic communications, copper, free-space, etc. At 1104, the receiver (sender) can authenticate the sender (receiver) using authentication data, such as an earlier QKD key, and establish a frequency bin QKD session. To proceed with distribution of the quantum key, at 1106, the receiver can randomly select a frequency bin measurement basis for incoming photons encoded with frequency bin qubits. At 1108, the receiver can receive and process the frequency bin defined qubits with a quantum frequency processor, and store the corresponding detected outcomes as raw QKD values. A sender can also store randomly selected encoding bases and measurement outcomes, e.g., through detection of entangled state photons, frequency comb encoding selections, or quantum frequency processor basis selections. After a last raw value for the QKD key at 1110, the receiver, at 1112, can publish frequency bin measurement bases and construct a sifted key by discarding unmatching measurement bases in response to sender input. At 1114, the sender and receiver can compare a selected subset of the sifted QKD key to determine a quantum bit error rate. At 1116, the sender and receiver can compare the error rate with a threshold to determine whether noise or eavesdropping compromise the generated key, and if compromised, can they can abort the key generation at 1118 and attempt another session. If the key is acceptable, they can proceed to amplify privacy using various methods and can form a suitable QKD key at 1120. At 1122, the sender can proceed to send a message encrypted with the key to the receiver. At 1124, the receiver can decode the encrypted message. At 1126, the sender and receiver can retain the key or a portion of the key so as to provide a basis for authentication in a subsequent encryption session.

Figure 12:
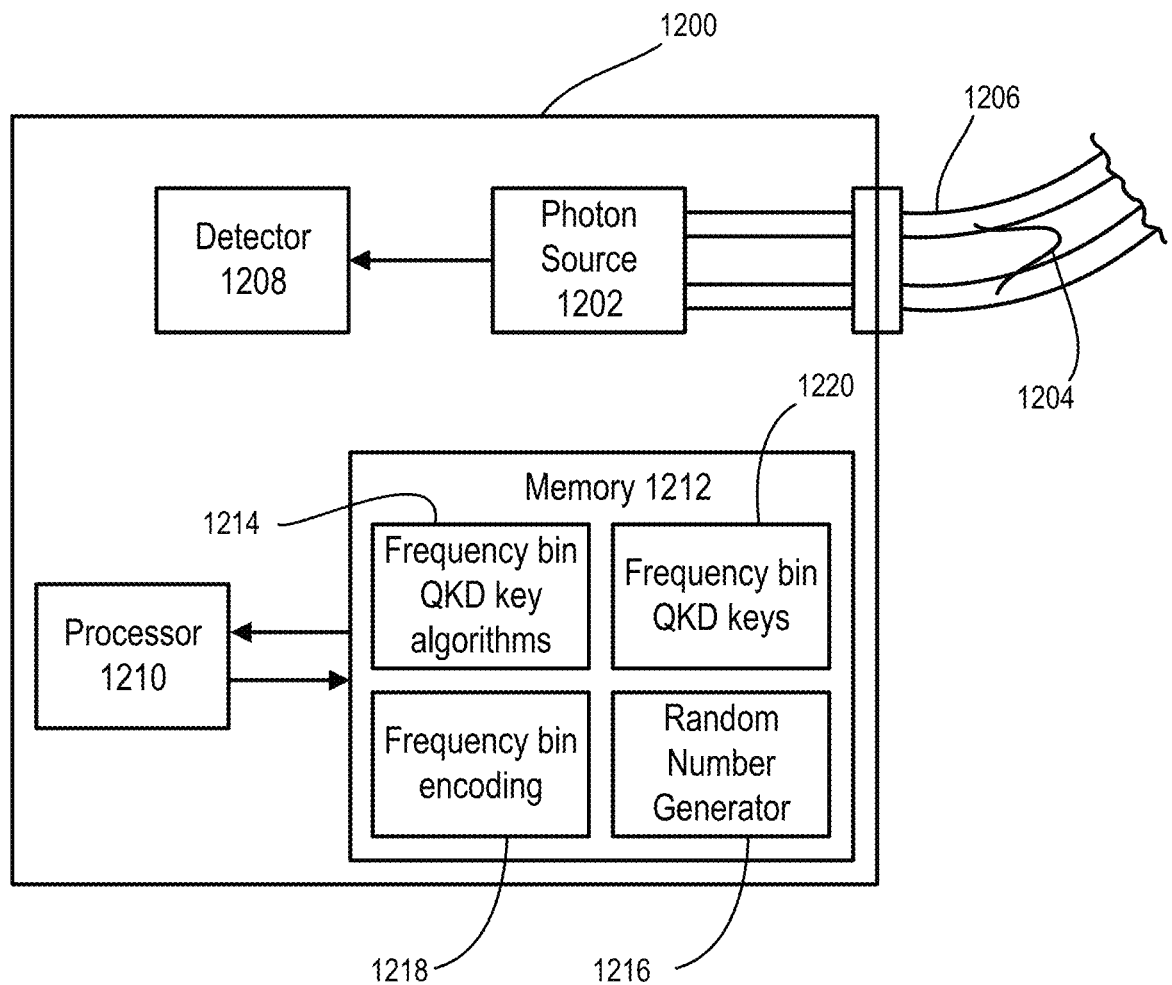
FIG. 12 is a schematic of an example quantum key distribution sender unit.

FIG. 12 shows an example sending unit 1200 configured to establish a quantum key with a receiver using one or more QKD protocols. In some examples, the sending unit 1200 includes a photon source 1202 configured to produce and direct photons 1204 out of the sending unit 1200 along a single-mode optical fiber 1206. Various photon sources can be used, including faint laser pulse sources such as attenuated laser diode emissions, two-photon heralding sources such as nonlinear photon generation sources (e.g., through spontaneous parametric down conversion or four-wave mixing where detection of one photon with a detector 1208 indicates the presence of the other), and various frequency combs (including microcombs using microring resonators, which can produce larger frequency-bin spacing in proportion to the free spectral range). Some photon sources can be configured with multiple photon generators to produce frequency-bin encoded photons in parallel. In some examples, the sending unit 1200 can be configured to receive photons in entangled quantum states from another source, so as to detect the photons with the detector 1208 according to entangled state QKD protocols (e.g., with the photon source 1202 being omitted where receiving the entangled photon from a distant location). In various examples, the sending unit 1200 can include a quantum frequency processor for defining quantum states of produced or received photons. The sending unit 1200 can include one or more processors 1210 and memories 1212 configured with processor readable instructions for carrying out QKD tasks, such as frequency bin QKD key algorithms 1214. For example, the memory 1212 will typically include a random number generator 1216 operable to apply a frequency bin encoding 1218 to photons generated with the photon source 1202 or received in an entangled state. Frequency bin QKD keys 1220 generated through the frequency bin QKD algorithms 1214 can be stored in the memory 1212 and can be used for quantum secret growing and authenticate subsequent transmissions with a receiver.

Figure 13:
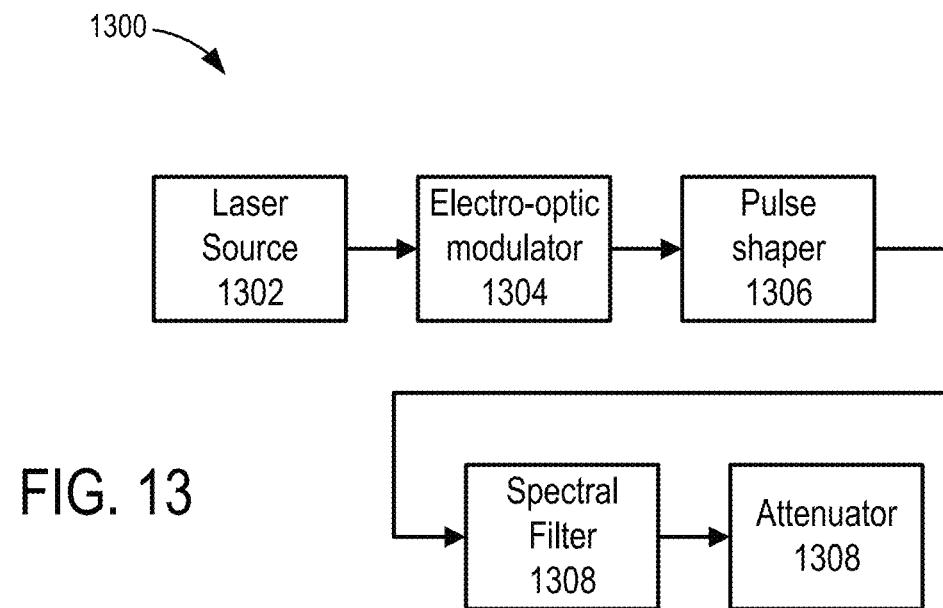
FIGS. 13-14 are schematics of example frequency combs.

An example frequency comb 1300 is shown in FIG. 13 that includes a laser source 1302 configured to generate photons in a selected frequency band. Suitable laser examples can include mode-locked lasers, pulsed lasers, continuous-wave lasers, Raman lasers, etc. Non-limiting examples can include Ti:sapphire lasers, erbium doped lasers, and semiconductor laser diodes (including InGaAsP sources). The laser source 1302 is coupled to an electro-optic modulator 1304 to produce a selected frequency bin state for the incident photons.

Figure 14:
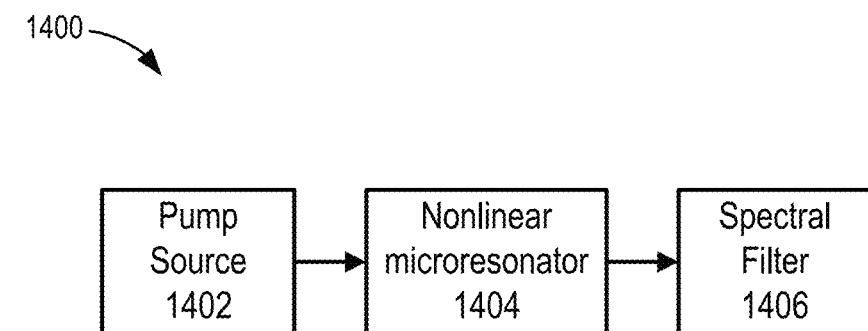

FIG. 14 shows an example of a frequency microcomb 1400 that includes a pump source 1402 configured to provide a pump light for parametric nonlinear conversion in a coupled nonlinear microresonator 1404, such as whispering gallery mode resonator in $LiNbO_3$ or an integrated microring resonator, using a suitable platform such as silicon-on-insulator, Hydex, Al—N, silicon nitride, etc. The coupled nonlinear microresonator 1404 can produce photons in a selected frequency bin range, and a spectral filter 1406 can be used to select and pass particular frequency bins.

Figure 15:
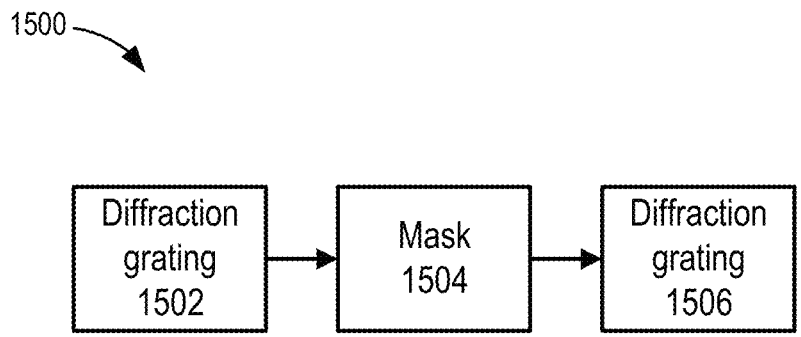
FIG. 15 is a schematic of an example pulse shaper.

FIG. 15 is an example pulse shaper 1500 that can be used to selectively apply phase shifts to incident photons, such as those propagating in a single spatial mode. The pulse shaper includes a first diffraction grating 1502 configured to disperse the frequency bin modes at different angles. A controllable mask 1504 is situated to receive the dispersed frequency bin modes and to apply different phase shifts to different frequency bin modes. A second diffraction grating 1506 is situated to receive the phase shifted, filtered frequency bins and to recombine the frequency bins to propagate in a single transverse spatial mode. One or more lenses or lens groups can be situated to couple the frequency bins between pulse shaper elements.

The follow documents are incorporated by reference herein for any and all purposes to the extent not inconsistent with the disclosure:
1. Lu et al., "Quantum interference and correlation control of frequency-bin qubits." Optica, vol. 5, no. 11, pp. 1455-1460, supplementary material pages 1-4 (November 2018).
2. Lukens et al., "Frequency-encoded photonic qubits for scalable quantum information processing." Optica, vol. 4, no. 1, pp. 8-16, supplementary material pages 1-4 (January 2017).
3. Lu et al., "A controlled-NOT gate for frequency-bin qubits." npj Quantum Information, vol. 5, art. 24 (Mar. 5, 2019).
4. Lu et al., "Electro-Optic Frequency Beam Splitters and Tritters for High-Fidelity Photonic Quantum Information Processing." Physical Review Letters, vol. 120, art. 030502, supplementary material pages 1-5 (January 2018).
5. Kues et al., "Quantum optical microcombs." Nature Photonics, vol. 13, no. 3, pp. 170-179 (March 2019).
6. Gisin et al., "Quantum cryptography," Reviews of Modern Physics, 74(1):145-195 (Jan. 1, 2002).
7. Gisin et al., "Quantum communication." Nature Photonics. 1:165-171 (March 2007).

GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, 'photon' refers to electromagnetic radiation at wavelengths of between about 100 nm and 10 µm, and typically between about 500 nm and 2 µm, and more typically in the telecommunications C-band between about 1530 nm to about 1565 nm. Examples based on available laser diode sources and optical fibers generally are associated with wavelengths of between about 800 nm and 1700 nm. For convenience, photons are referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core can be doped with a rare earth element such as Nd, Yb, Ho, Er, Yb, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A method of quantum key distribution, comprising:
   receiving a frequency bin photon at a location;
   selecting a frequency bin photon quantum key distribution measurement basis;
   with a quantum frequency processor, performing a measurement basis transformation on the received frequency bin photon so that the frequency bin photon is measurable in the selected frequency bin photon quantum key distribution measurement basis; and
   detecting the frequency bin photon in the selected quantum key distribution measurement basis and assigning a quantum key distribution key value based on the detection to a portion of a quantum key distribution key.

2. The method of claim 1, further comprising repeating the steps of claim 1 and forming the quantum key distribution key from the assigned quantum key distribution key values.

3. The method of claim 2, further comprising:
   receiving a transmission encoded with the quantum key distribution key; and
   decoding the transmission with the quantum key distribution key.

4. The method of claim 2, wherein the forming comprises forming the quantum key distribution key as a one-time pad.

5. The method of claim 2, wherein the forming comprises:
   publishing the selected frequency bin photon quantum key distribution measurement bases;
   discarding assigned quantum key distribution key values that do not have a matching measurement basis between a sender and receiver and retaining assigned quantum key distribution key values that do have a matching measurement basis to form the quantum key distribution key;
   comparing a subset of the retained assigned quantum key distribution values to determine a quantum bit error rate for the quantum key distribution key; and
   determining whether to keep the quantum key distribution key based on the quantum bit error rate.

6. The method of claim 5, further comprising amplifying the privacy of the quantum key distribution key.

7. The method of claim 1, wherein the performing the measurement basis transformation comprises defining a Hadamard gate with the quantum frequency processor and performing the measurement basis transformation with the Hadamard gate.

8. The method of claim 1, wherein the performing the measurement basis transformation with the quantum frequency processor comprises:
   directing the received frequency bin photon through a first electro-optic modulator configured to mix frequency modes of the received frequency bin photon and form a mode-mixed frequency bin photon,
   directing the mode-mixed frequency bin photon through a pulse shaper configured to selectively adjust a phase of different frequency modes of the mode-mixed frequency bin photon, and
   directing the pulse-shaped mode-mixed frequency bin photon through a second electro-optic modulator configured to return frequency modes scattered outside of an encoding space of the pulse-shaped mode-mixed frequency bin photon.

9. The method of claim 8, wherein the performing the measurement basis transformation with the quantum frequency processor comprises directing the received frequency bin photon through N+1 electro-optic modulators and N pulse shapers alternately arranged in series.

10. The method of claim 1, further comprising:
   receiving additional frequency bin photons across a range of frequency bin channels of a frequency comb spectrum simultaneous with the received frequency bin photon.

11. The method of claim 10, further comprising parallel processing the additional frequency bin photons with the quantum frequency processor.

12. The method of claim 11, wherein the parallel processing comprises, simultaneous or nearly simultaneous with receiving the frequency bin photon:
   selecting frequency bin photon quantum key distribution measurement bases for the additional frequency bin photons;
   with the quantum frequency processor, performing measurement basis transformations on the additional frequency bin photons so that the additional frequency bin photons are measurable in the selected frequency bin photon quantum key distribution measurement bases; and
   detecting the additional frequency bin photons in the selected quantum key distribution measurement bases and assigning quantum key distribution key values to the quantum key distribution key based on the detection to (i) another portion of the quantum key distribution key or (ii) one or more other quantum key distribution keys different from the quantum key distribution key.

13. The method of claim 1, wherein the receiving the frequency bin photon comprises receiving one or more photons along a common optical path of a single-mode optical fiber.

14. The method of claim 1, wherein the receiving the frequency bin photon comprises receiving the frequency bin photon as a single photon generated, encoded, and sent from a distant location.

15. The method of claim 1, wherein the receiving the frequency bin photon comprises receiving the frequency bin photon as an entangled state photon generated at a distant location without being encoded with any information at the distant location such that a distant photon forms an entangled state partner of the entangled state photon.

16. The method of claim 1, wherein the performing the measurement basis transformation with the quantum frequency processor comprises directing the received frequency bin photon through an integrated photonic chip.

17. The method of claim 1, wherein the receiving the frequency bin photon comprises receiving the frequency bin photon as a photon in superposition with a plurality of frequency bins.

18. The method of claim 1, further comprising receiving an other frequency bin photon at the location, wherein the other frequency bin photon is entangled with the frequency bin photon and separated by a plurality of frequency bins from the frequency bin photon, wherein the frequency bin photon and the other frequency bin photon form an entangled photon pair.

* * * * *